Nov. 28, 1961  D. M. McBEAN ET AL  3,010,588
ARTICLE UNLOADER
Filed Sept. 20, 1957  13 Sheets-Sheet 1
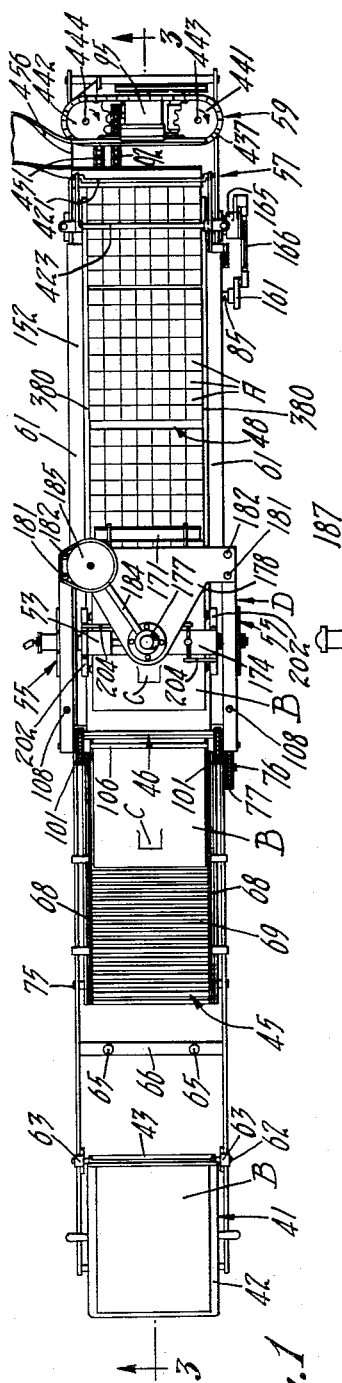
INVENTORS
DOUGLAS M. McBEAN
LAURENCE C. TALLMAN
BY Charles H. Erne
Leland R. McCann
George W. Reiber
ATTORNEYS

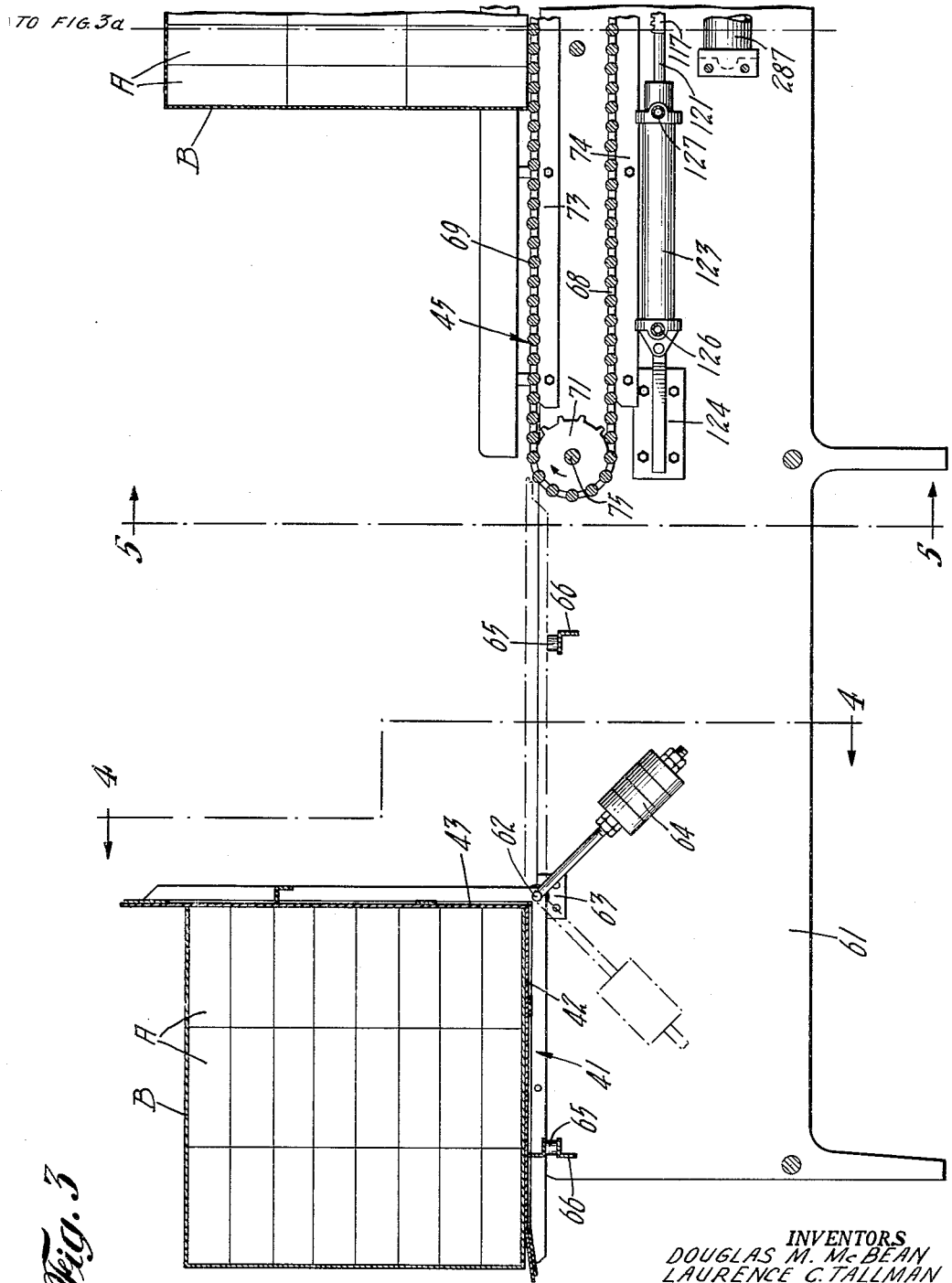

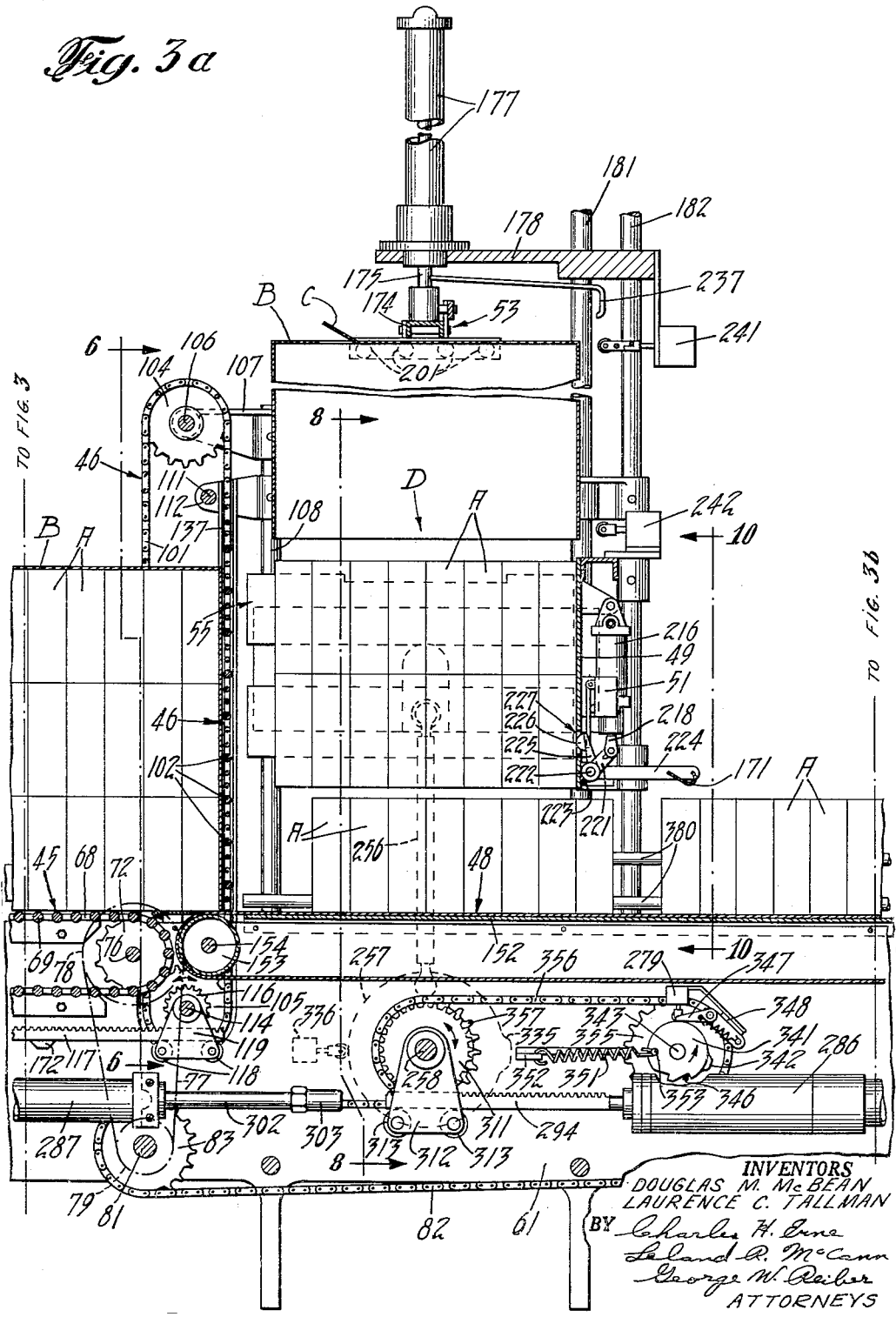

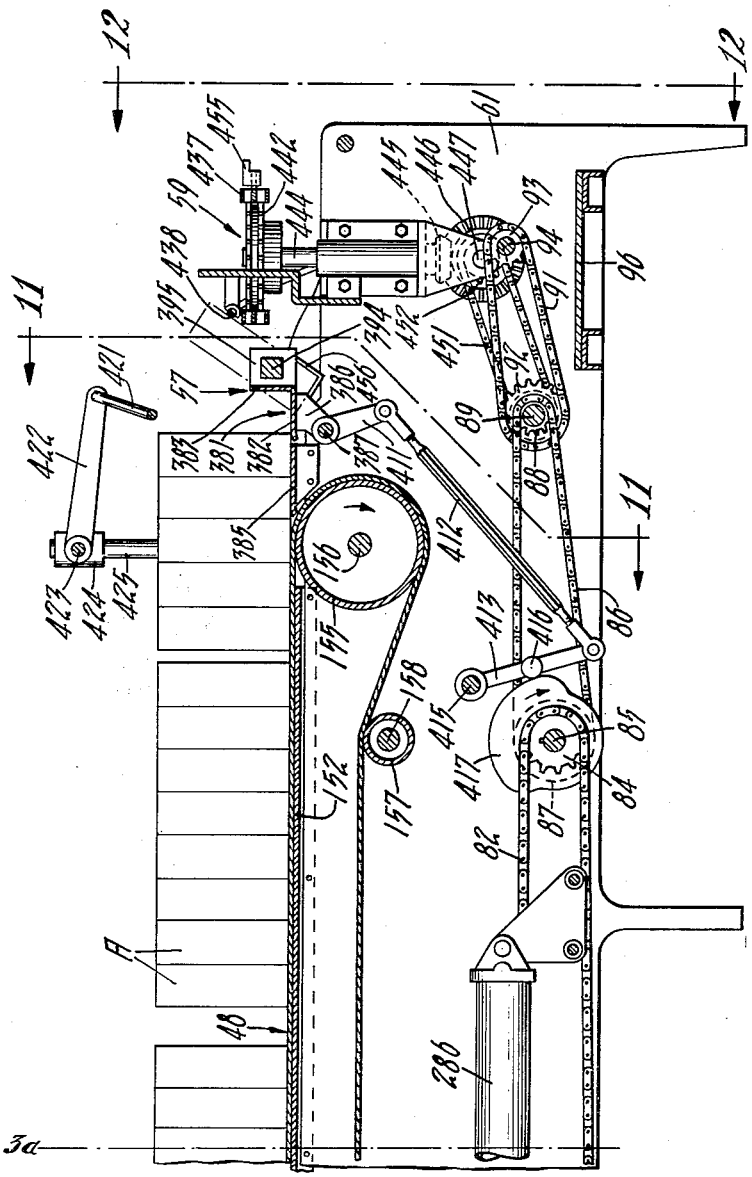

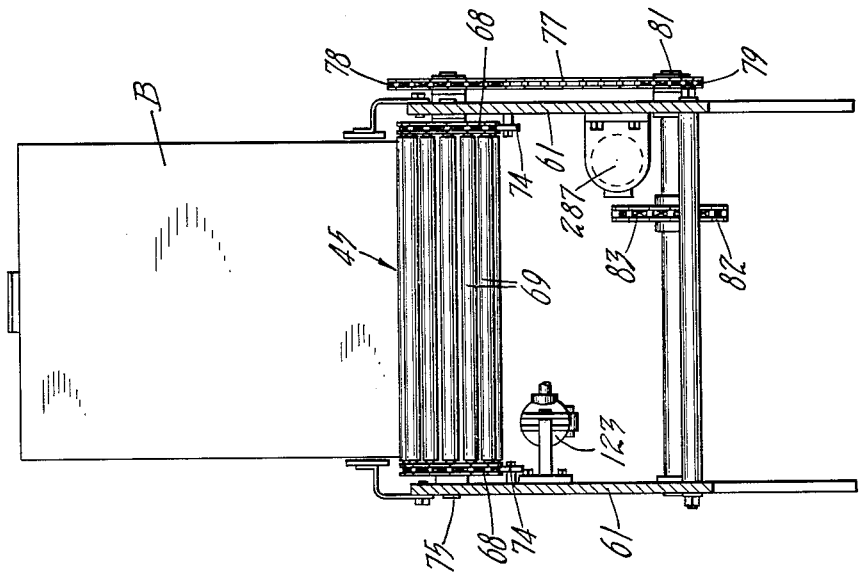
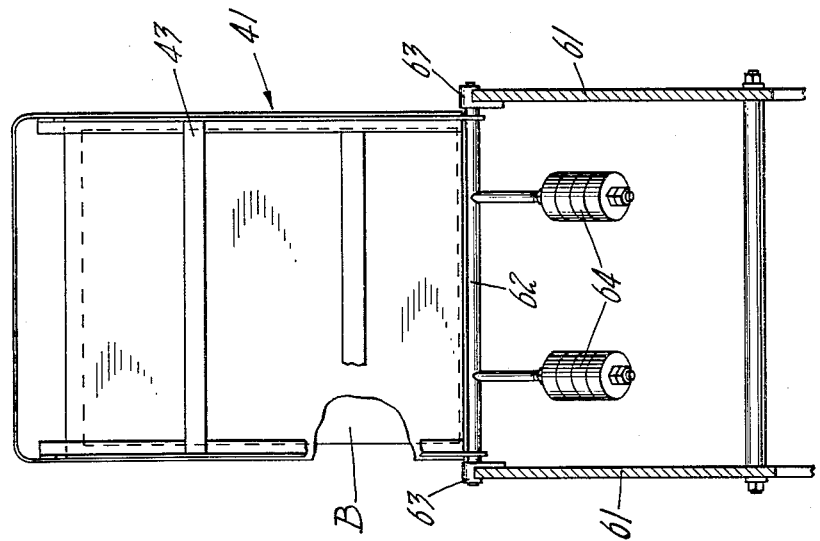

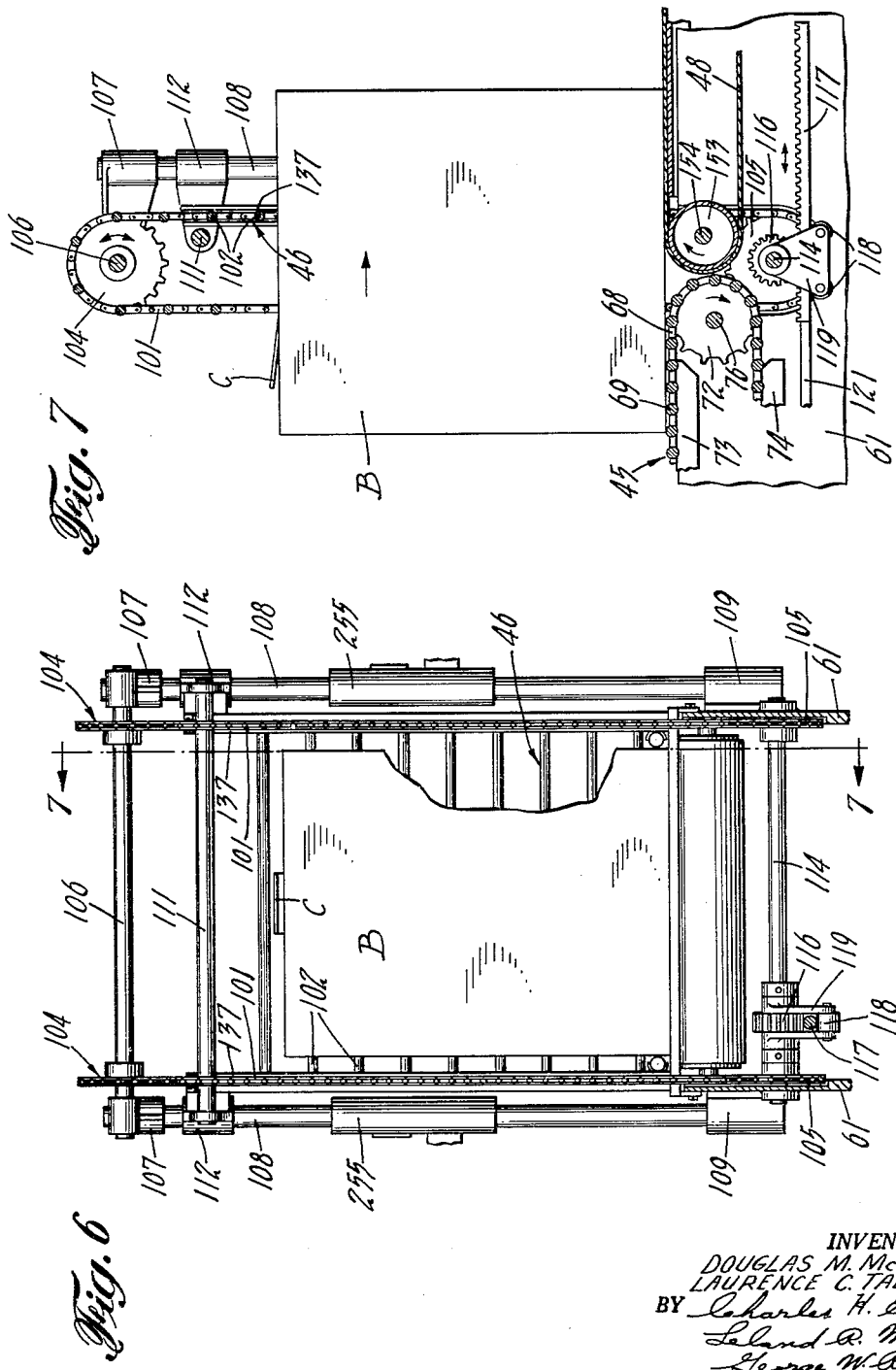

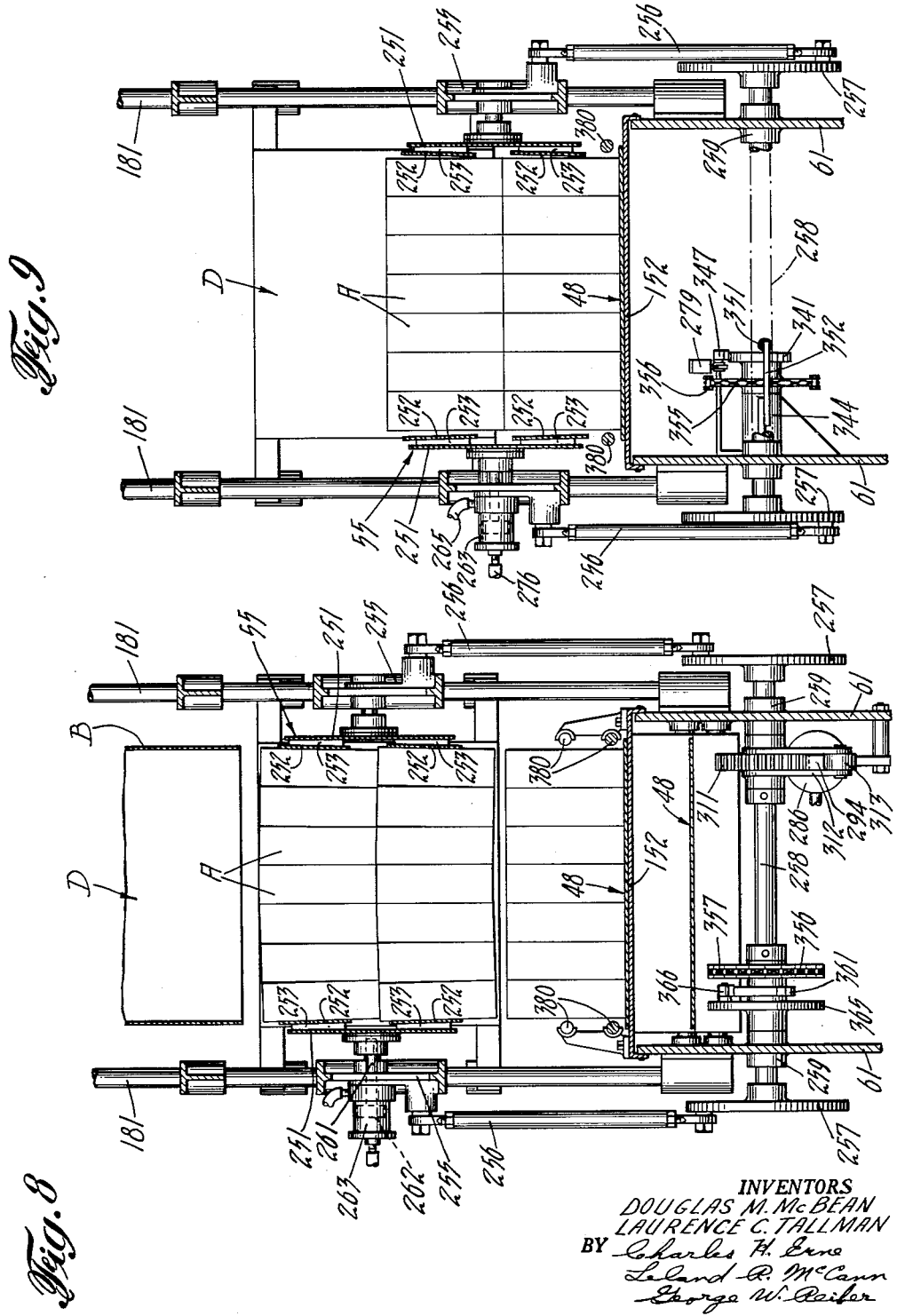

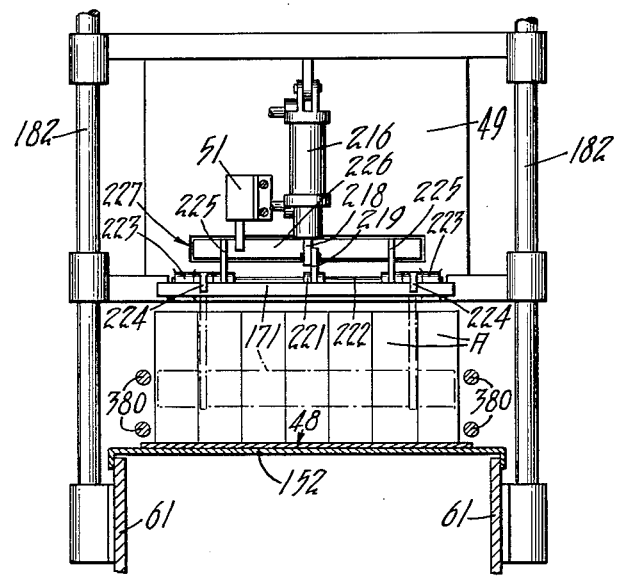
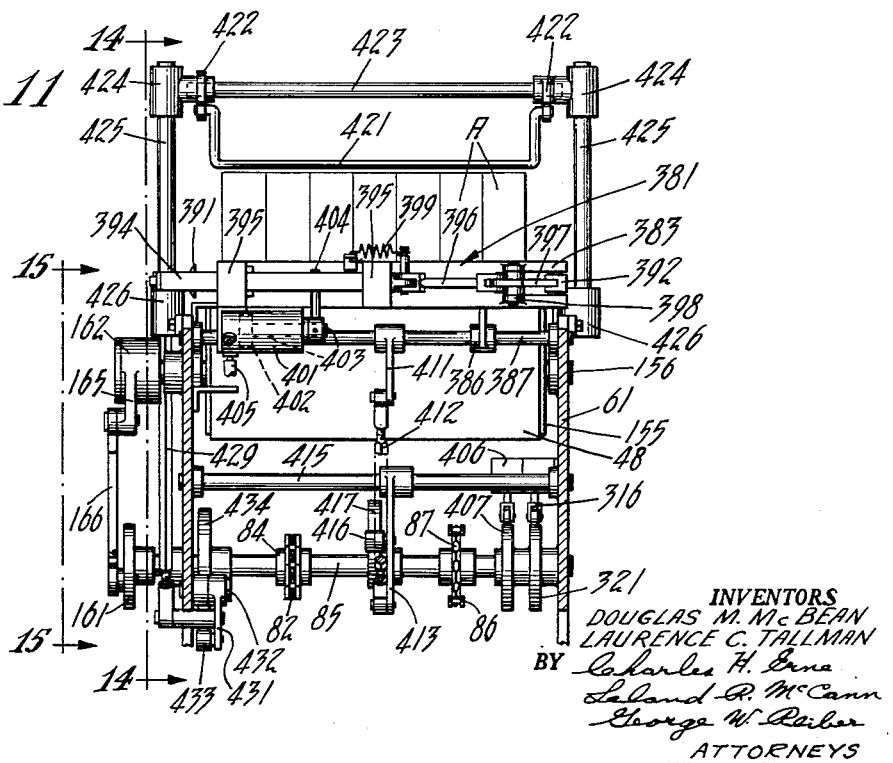

INVENTORS
DOUGLAS M. McBEAN
LAURENCE C. TALLMAN
BY Charles H. Erne
Leland G. McCain
George W. Reiber
ATTORNEYS Nov. 28, 1961   D. M. McBEAN ET AL   3,010,588
ARTICLE UNLOADER
Filed Sept. 20, 1957   13 Sheets-Sheet 10
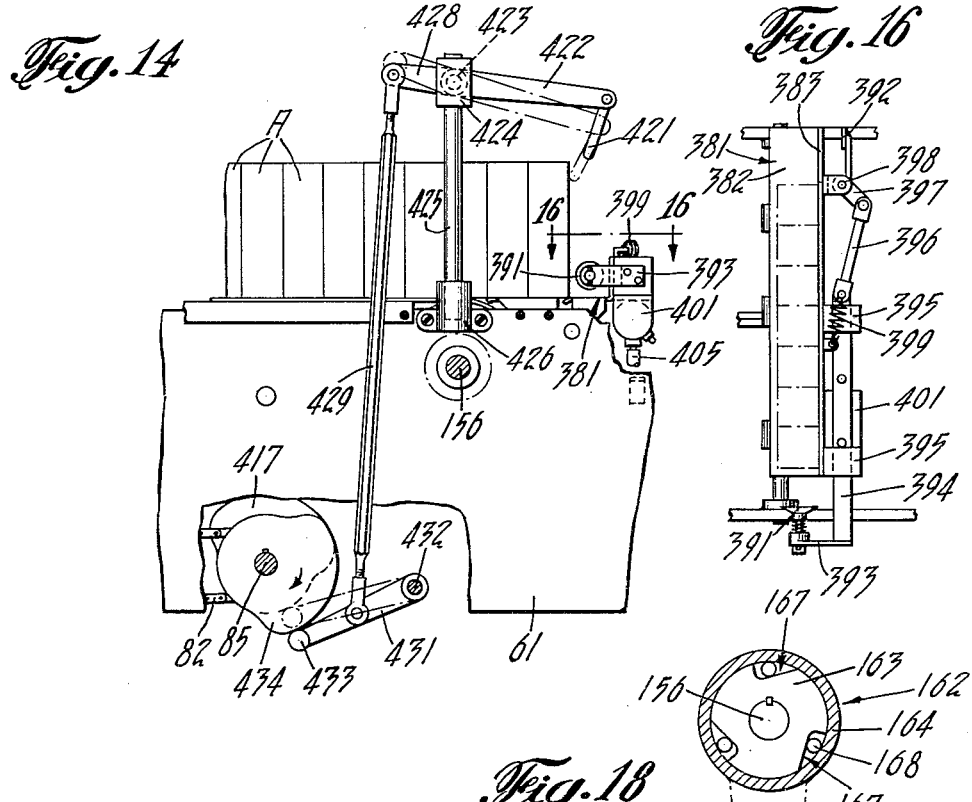
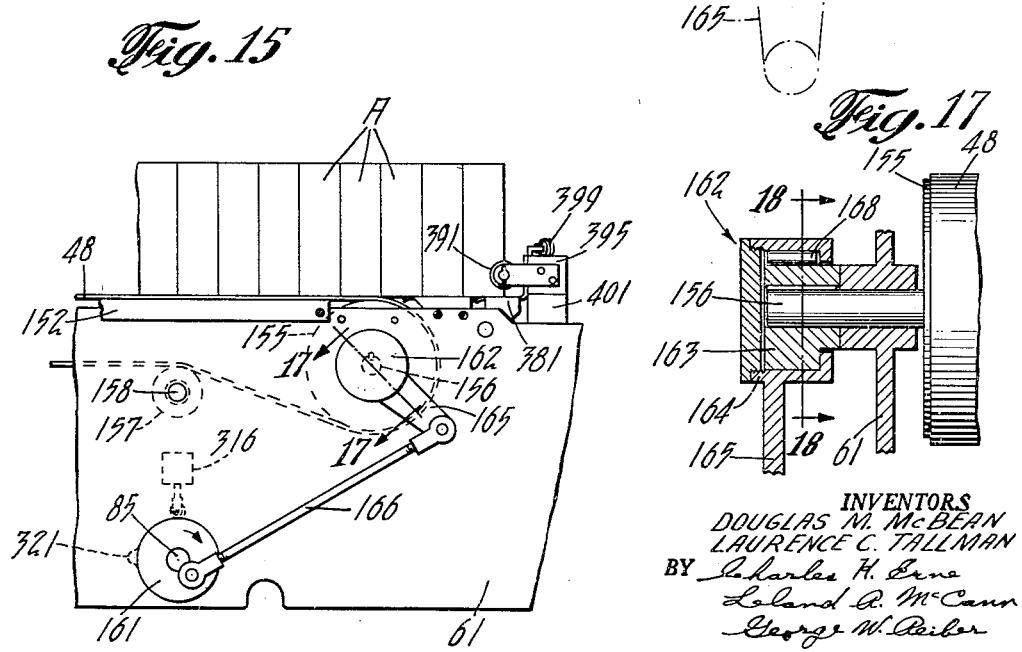
INVENTORS
DOUGLAS M. McBEAN
LAURENCE C. TALLMAN
BY Charles H. Erne
Leland D. McCann
George W. Reiber
ATTORNEYS Nov. 28, 1961    D. M. McBEAN ET AL    3,010,588
ARTICLE UNLOADER
Filed Sept. 20, 1957    13 Sheets-Sheet 11
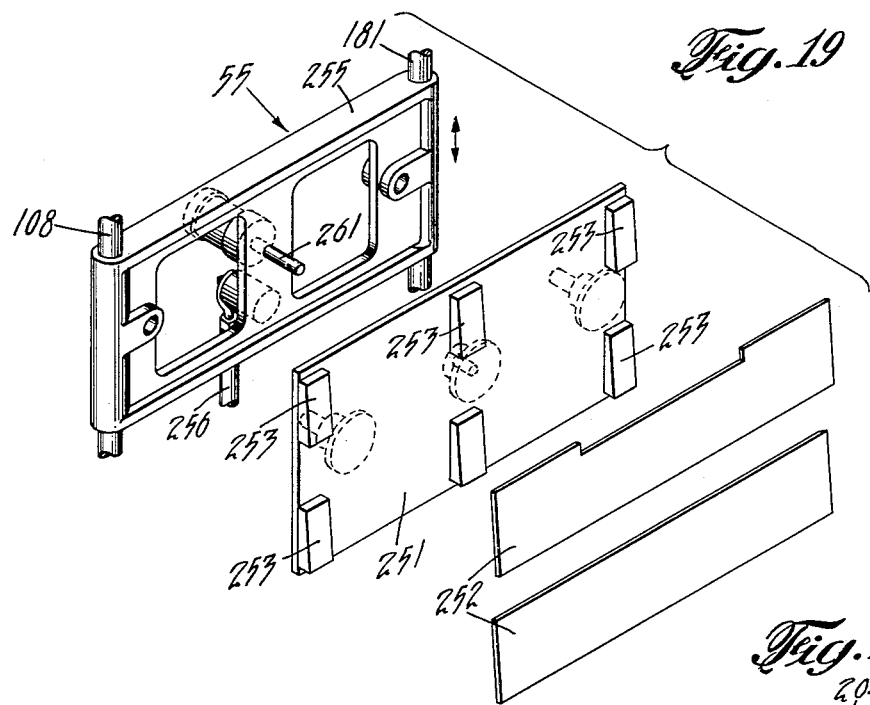
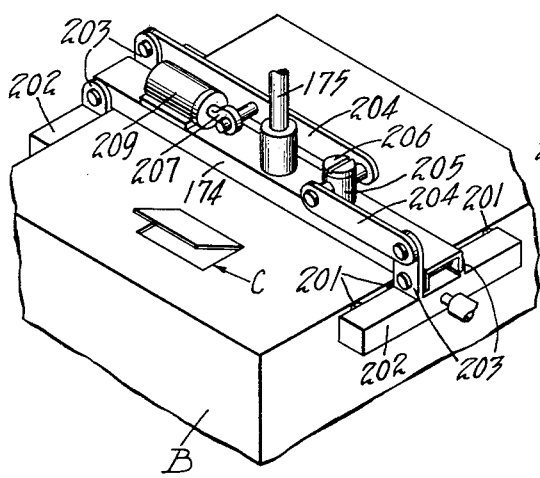
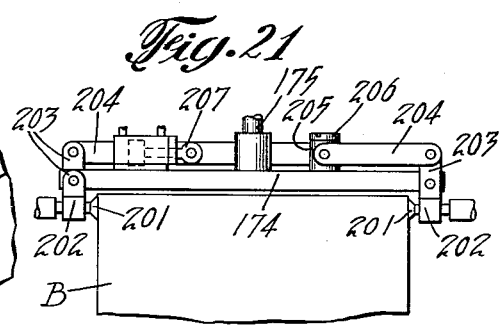
INVENTORS
DOUGLAS M. McBEAN
LAURENCE C. TALLMAN
BY Charles H. Line
Leland A. McCann
George W. Reiber
ATTORNEYS

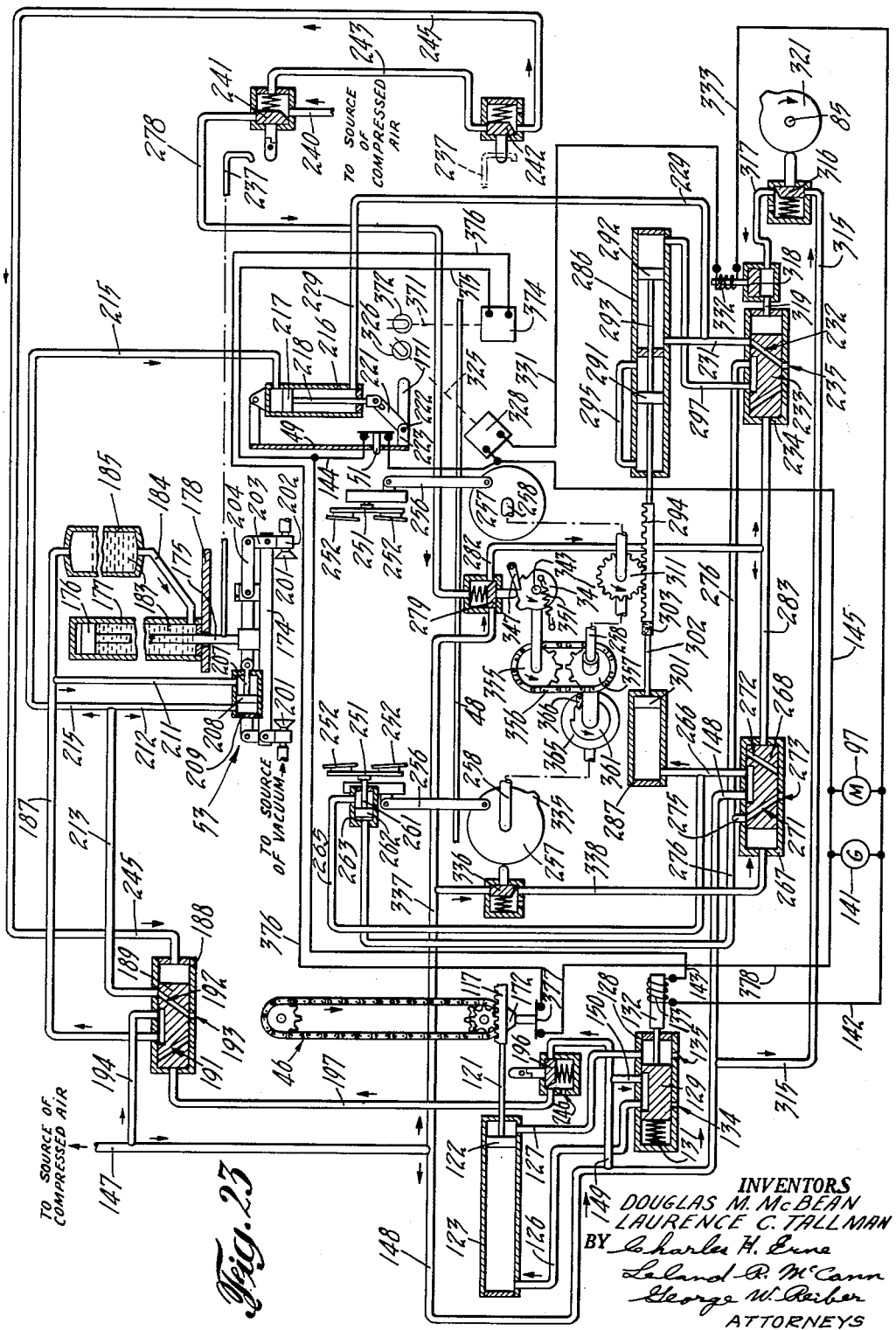

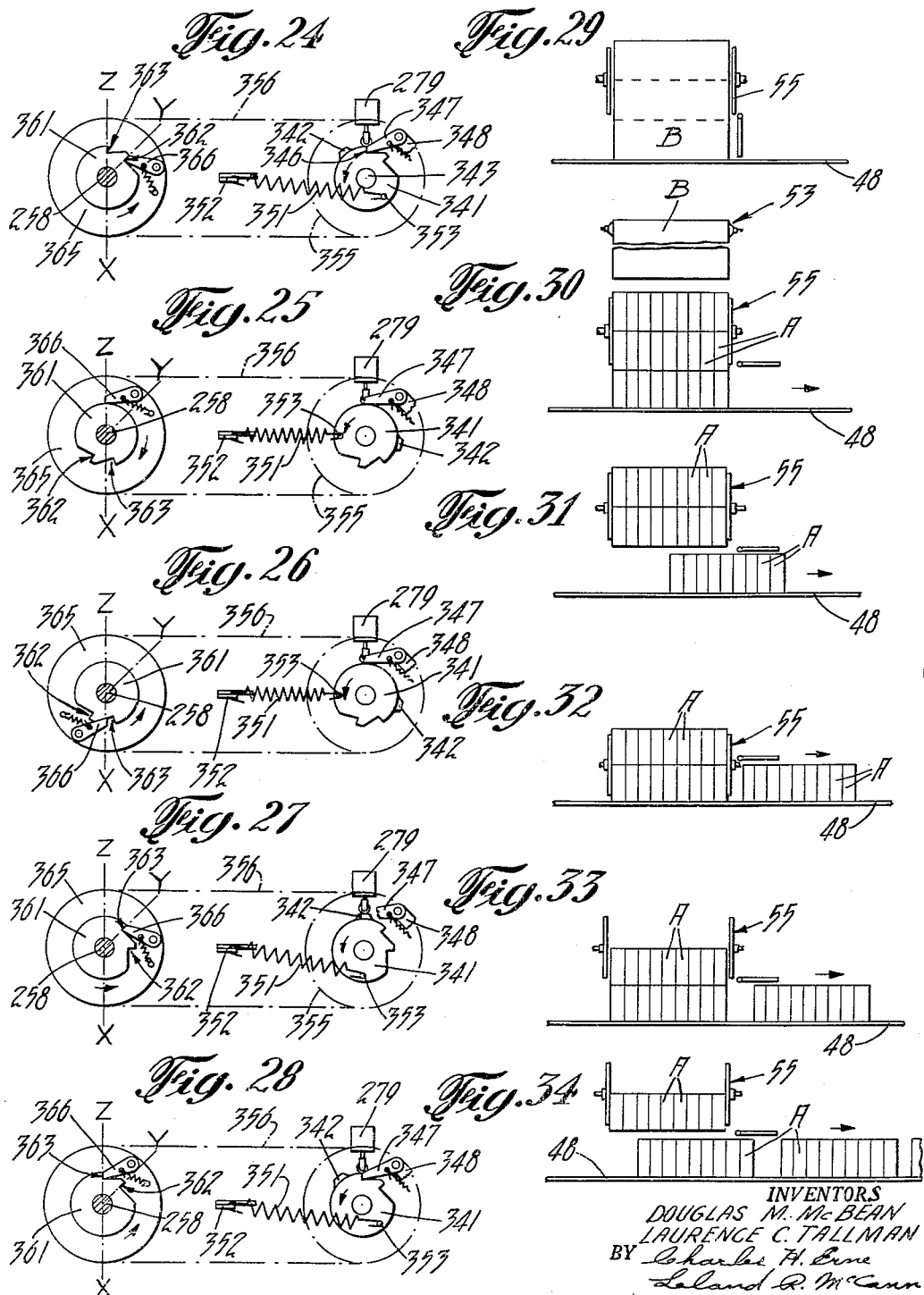

3,010,588
Patented Nov. 28, 1961

3,010,588
ARTICLE UNLOADER
Douglas M. McBean, Rochester, and Laurence C. Tallman, Churchville, N.Y., assignors, by mesne assignments, to American Can Company, New York, N.Y., a corporation of New Jersey
Filed Sept. 20, 1957, Ser. No. 685,157
7 Claims. (Cl. 214—8.5)

The present invention relates to a machine for unloading articles from an organized unit or stack and has particular reference to such a machine for removing a carrier from the unit when such a carrier is used and for feeding the articles from the uncovered stack in an orderly fashion so as to set the articles apart in line formation for a subsequent operation.

The instant invention is particularly advantageous in the handling of articles such as cans or containers which at the manufacturing plant are packed in stacks of orderly arranged rows and layers in sealed fibre shipping bags or carriers to facilitate keeping the containers clean while held in storage and during transportation to the packers plant where the containers are to be filled. At the packers plant the containers are removed from the carriers and are fed into the filling or other machines for filling or other subsequent operation. Usually this is a manually performed operation, the containers being merely dumped out of the carriers onto a pile where an unscrambling machine or other device carries them away and in a fashion separates them and turns them with the right end up for transfer into the filling or other subsequent operation machine. However this procedure often damages the containers.

An object of the instant invention is to provide an unloading machine which receives the carrier filled with its containers and strips the carrier off, leaving the containers right end up and in their original stacked formation and then feeds the containers from the stack in orderly fashion in such a manner as to set the containers apart in line formation for immediate transfer into a filling or other subsequent operation machine.

Another object is the provision of such a machine which is capable of receiving a unit or stack of containers without a carrier and for separating the containers by layers and rows for further advancement in line formation.

Another object is the provision of such a machine which is capable of handling a substantially continuous supply of carriers or stacks in processional order and to maintain a substantially continuous separation of the units into rows for transfer into line formation.

Another object is to provide such a machine that can handle the carriers or stacks rapidly and in a gentle manner to provide for efficiency in operation and handling of the containers without damage.

Numerous other objects and advantages of the invention will be apparent as it is better understood from the following description, which, taken in connection with the accompanying drawings, discloses a preferred embodiment thereof.

Referring to the drawings:

FIGURE 1 is a top plan view of a machine embodying the instant invention;

FIG. 2 is a side elevation of the machine shown in FIG. 1;

FIGS. 3, 3a and 3b are enlarged sectional views, which when taken together disclose a longitudinal section taken substantially along the line 3—3 in FIG. 1;

Figure 12:
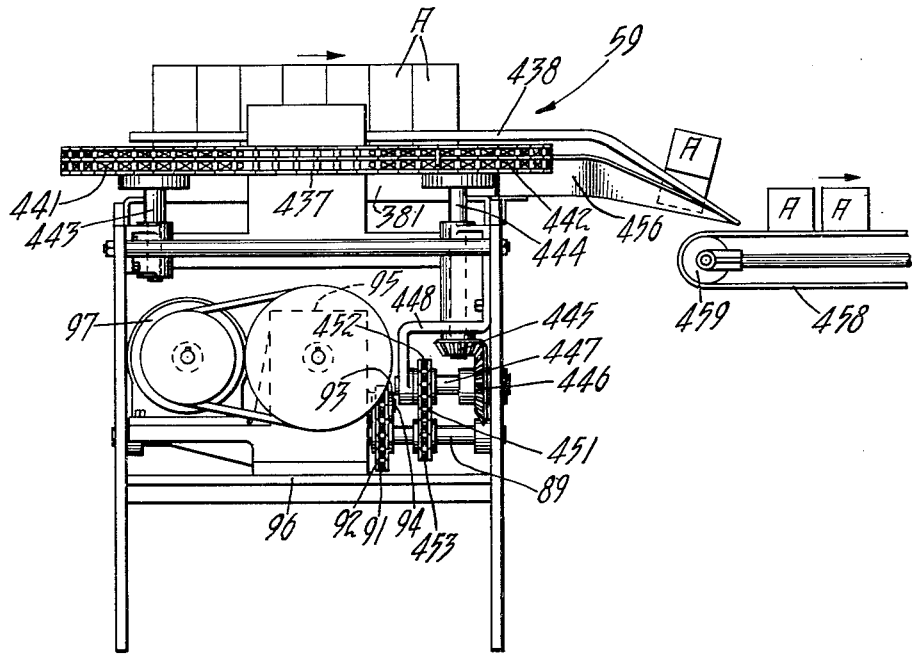
Figure 13:
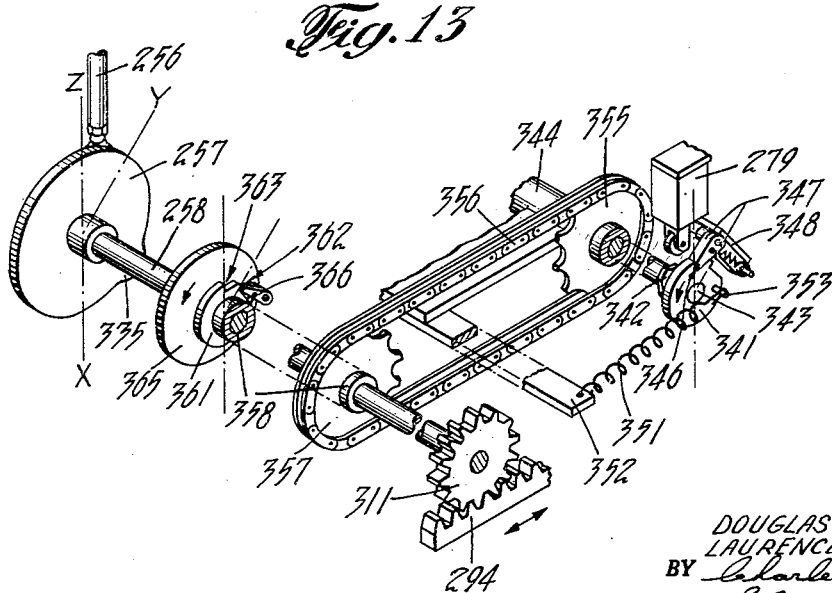

FIGS. 4 and 5 are transverse sectional views taken substantially along the respective lines 4—4 and 5—5 in FIG. 3;

FIG. 6 is a transverse sectional view taken substantially along the line 6—6 in FIG. 3a;

FIG. 7 is a sectional view taken substantially along the line 7—7 in FIG. 6;

FIGS. 8 and 9 are sectional views taken substantially along the line 8—8 in FIG. 3a, the two views showing certain of the machine parts in different positions;

FIG. 10 is a transverse sectional view taken substantially along the line 10—10 in FIG. 3a;

FIGS. 11 and 12 are transverse sectional views taken substantially along the respective lines 11—11, 12—12 in FIG. 3b;

FIG. 13 is a schematic perspective view of a timing mechanism illustrated in the lower portion of FIG. 3a;

FIGS. 14 and 15 are fragmentary side elevations as viewed substantially along vertical planes indicated by the respective lines 14—14, 15—15 in FIG. 11;

FIG. 16 is a fragmentary top plan view as taken substantially along the line 16—16 in FIG. 14;

FIG. 17 is an enlarged sectional view of a free wheeling clutch device as taken substantially along the line 17—17 in FIG. 15;

FIG. 18 is a sectional view taken substantially along the line 18—18 in FIG. 17;

FIG. 19 is a schematic, exploded, perspective view of parts of a clamping device shown in the upper portion of FIG. 8 on both sides of the machine;

FIG. 20 is a fragmentary perspective view of a suction cup, bag removing device located in the upper portion of the machine as shown in FIG. 3a;

FIGS. 21 and 22 are fragmentary side elevations of the device shown in FIG. 20, the two elevations showing the suction cups in different positions;

FIG. 23 is a diagrammatic view illustrating principal mechanical elements of the machine combined with an electric wiring diagram;

FIGS. 24 to 28 inclusive are fragmentary schematic views illustrating the sequential positions of certain of the parts of the timing device shown in FIG. 13 during a cycle of its operation; and FIGS. 29 to 34 inclusive are fragmentary schematic views illustrating how the instant machine unloads articles from an organized unit or stack delivered to the machine.

As a preferred and exemplary embodiment of the instant invention the drawings illustrate a machine for receiving and unloading a plurality of articles A (FIGS. 1, 2 and 3) arranged in orderly rows and layers contained in a shipping carton or fibre carrier B. The machine is particularly adapted to the handling of articles such as the well-known rectangular fibre milk containers of the character disclosed in United States Patent 2,085,979 issued July 6, 1937, to John M. Hothersall on Container. Hence the drawings illustrate the articles as milk containers by way of example.

As an incident to unloading the containers A from a carrier B, an operator first cuts the bottom out of the carrier and then delivers the carrier to the machine, the carrier being received on a turn-over table 41 (FIGS. 1, 2 and 3) with the containers in the carrier lying on their sides on a horizontal leg 42 of the table and with the tops of the containers positioned toward the left as viewed in the figures. The open bottom of the carrier abuts against a vertical wall section 43 of the table. Either prior to or after delivery of the carrier to the table the operator preferably cuts a slit or flap C in the top of the carrier to admit air to facilitate subsequent removal of the carrier as will be hereinafter explained.

With the carrier B on the table 41, the latter is turned over (toward the right in FIGS. 1 and 3) through an arc of 90° to turn the carrier right side up. The carrier is then pushed off the table (toward the right in FIGS. 1 and 3) onto a continuously moving horizontal feed-in conveyor 45. The conveyor 45 advances the carrier and its containers through an entrance gate 46 and in so doing transfers them to a continuing, intermittently actuated, horizontal, unloading conveyor 48 which advances the carrier into position at an unloading station D (FIGS. 1, 2 and 3a). At this station D the carrier engages a locating plate 49 (FIG. 3a) containing an electric switch 51 which when engaged by the carrier sets in motion devices to close the gate 46 behind the located carrier B to hold back the next following carrier until the located carrier is unloaded.

As soon as the gate 46 is closed, a carrier removal device 53 located above the unloading station D, descends upon the carrier, gently attaches itself to two opposed sides of the carrier near its top end, and pulls the carrier upwardly away from the stack or unit of containers within it as shown in FIGS. 3a and 30. The slit or flap C in the top of the carrier permits of this removal without creating a vacuum inside the carrier and thus provides for easy stripping of the carrier off the containers. This leaves the stack of containers resting on the unloading conveyor 48. The conveyor 48 is at rest at this time.

By way of example, the stack of containers A shown in the drawings comprises three horizontal layers each of which contains 8 transverse rows of 7 containers. After removal of the carrier B, a clamping device 55 engages two opposing sides of the stack adjacent the upper two layers of containers as shown in FIG. 30 and lifts these two layers clear of the lowermost layer as shown in FIG. 31. While the upper two layers of containers are held suspended, the unloading conveyor 48 which operates continuously through advancing steps substantially equal to the width of one container, gradually advances the lowermost layer of containers to a position slightly in advance of the stack. Then while the conveyor 48 is at a rest period between its step-by-step advancements, the clamping device 55 moves down toward the conveyor until the second layer, now the lowermost layer, engages against the conveyor as shown in FIG. 32.

With the second layer of containers resting on the conveyor 48, the clamping device 55 releases the stack and moves up the height of one layer as shown in FIG. 33 and then moves in and clamps against the upper layer as shown in FIG. 34. As soon as the upper layer is clamped tight, the clamping device 55 moves up to clear this upper layer free of the second layer, leaving the second layer free on the conveyor 48 as shown in FIG. 34 for advancement therewith in the same manner as the first layer was advanced.

When the second layer of containers is advanced from under the remaining portion of the stack, the clamping device 55 lowers the remaining layer of containers to the conveyor, then releases them and moves up out of the way again as in the case of the second layer, effecting a complete repeat operation and leaving the last layer of containers on the conveyor.

With the placing of the last layer of containers onto the unloading conveyor 48, the gate 46 is opened, and hence when the conveyor 48 moves through a repeat cycle of advancement, it moves a new carrier B with its full stack of containers into the loading station D at the same time as it advances the last layer of containers from the first carrier, out of the unloading station D. In this manner each carrier B as it enters the unloading station D in processional order, is stripped off its stack of containers and the containers layer-by-layer are removed from the bottom of the stack and are advanced by the conveyor 48 in slightly spaced apart relation in processional order.

As the unloading conveyor 48 moves through its intermittent cycles of operation, the procession of layers of containers formed thereon is advanced step-by-step toward the discharge end of the machine, at the right in FIGS. 1, 2 and 3b. At this discharge end of the machine each row of containers in each layer, is picked off separately by a transfer device 57 and is transferred into a discharge conveyor 59 which advances the rows transversely of the machine and thereby arranges them in a single line procession for entrance into a filling or other subsequent operation machine.

The various devices used in the machine to perform the different functions in proper sequence are supported on a pair of side frames 61 (FIGS. 1 and 2) having suitable transverse connecting members as shown in FIGS. 4 and 5, which constitute the main frame of the machine. The turnover table 41 which initially receives the carrier B is located at the entrance end of the machine (at the left as viewed in FIGS. 1, 2 and 3) and is mounted on a pivot shaft 62 (see also FIG. 4) which extends transversely of the frames 61 and at its ends is carried in bearings 63 mounted on the frames. A pair of counterweights 64 attached to the shaft intermediate its ends are provided to facilitate turning the table over when required. Stop buttons 65 (FIG. 3) carried on a pair of transverse members 66 of the frames are provided to support the table in its two positions.

The feed-in conveyor 45 which receives the carrier B from the table 41 is disposed between the two side frames 61 (see FIGS. 1, 2, 3, 3a, and 4) and extends in a horizontal direction from the turned-over position of the table 41 to the entrance gate 46, a distance substantially equal to the length of two carriers B. This entrance conveyor 45 preferably comprises a pair of spaced and parallel endless chains 68 carrying between them a plurality of closely spaced transverse rollers 69 having trunnions freely rotatable in bearings in the chains. The upper run of the conveyor 45 supports the carrier B and its containers A, the rollers 69 providing a smooth rolling support for the containers at the open bottom of the carrier.

The feed-in conveyor chains 68 operate over spaced pairs of idler sprockets 71 (FIG. 3) and driving sprockets 72 (FIG. 3a) which are rotated continuously. Intermediate the sprockets the upper and lower runs of the chains are supported on horizontal tracks 73, 74 secured to the frames 61.

The idler sprockets 71 are located adjacent the table 41 and are mounted on a transverse shaft 75 (FIG. 3) journaled in suitable bearings attached to the frames 61. The driving sprockets 72 are located adjacent the entrance gate 46 and are mounted on a transverse shaft 76 (FIGS. 1, 2, 3a and 7) journaled in suitable bearings in the frames 61. The driving shaft 76 is rotated by an endless chain 77 which operates over a sprocket 78 on the shaft 76 and over a sprocket 79 on a transverse shaft 81 journaled in suitable bearings in the frames 61. The shaft 81 in turn is actuated by an endless drive chain 82 (FIGS. 3a and 3b) which operates over a driven sprocket 83 on the shaft 81 and over a driving sprocket 84 on a cam shaft 85 (see also FIG. 11) journaled in suitable bearings in the frames 61.

The cam shaft 85 is rotated continuously by an endless chain 86 (FIG. 3b) which operates over a sprocket 87 on the shaft 85 and over a driving sprocket 88 on a transverse shaft 89 (see also FIG. 12) journaled in suitable bearings in the frames 61. The shaft 89 in turn is rotated by an endless chain 91 which operates over a sprocket 92 on the shaft 89 and over a sprocket 93 (see also FIG. 12) on a shaft 94 of a conventional speed reduction unit 95 supported on a platform 96 located between the frames 61 and actuated through a belt and pulley connection with a continuously operating electric motor 97 (FIG. 12) which is the main source of power for the machine.

Since the feed-in conveyor 45 operates continuously, through the continuous operation of the electric motor 97, a carrier B deposited on the conveyor is immediately carried forward toward the entrance gate 46. If the gate 46 is closed, the carrier B is stopped by the gate and the conveyor continues operating and rolls under the stopped carrier without injuring the containers. If the gate 46 is open the advancing carrier passes through and immediately enters the unloading station D. Normally the gate 46 is only open when first starting the machine. After the first carrier B enters the unloading station D, the gate normally remains closed until a new carrier is required.

The gate 46, which is located at the terminal end of the feed-in conveyor 45, preferably is a vertically disposed, transversely spaced, pair of endless chains 101 (FIGS. 3a, 6 and 7) carrying between them, for a distance slightly greater than the height of a carrier B, a plurality of horizontally disposed gate bars 102. The gate chains 101 operate over pairs of spaced upper sprockets 104 and lower sprockets 105. The upper sprockets 104 are mounted on a shaft 106 which extends across the machine above the path of travel of the carriers B, and is journaled in a pair of bearing brackets 107 secured to a pair of upright posts 108 located one on each side of the machine. At their lower ends the posts 108 are secured in anchor blocks 109 attached to the frames 61. The upper ends of the posts 108 are tied together by a transverse rod 111 secured in anchor blocks 112 mounted on the posts adjacent the brackets 107.

The lower gate chain sprockets 105 are mounted on a cross-shaft 114 which extends under the path of travel of the carriers B and is journaled in bearings in the frames 61. The gate 46 is actuated by a spur gear 116 which is secured to the cross-shaft 114 and meshes with a horizontally disposed rack 117. The rack is held in engagement with the gear by a pair of support rollers 118 (FIG. 3a) mounted in a clevis bracket 119 suspended from the shaft 114 adjacent the gear 116.

The rack 117 is attached to the outer end of a piston rod 121 (FIGS. 3 and 23) having a piston 122 which operates in a fluid pressure (preferably compressed air) cylinder 123. The cylinder 123 is pivotally secured to a bracket 124 attached to one of the frames 61. The piston 122 is reciprocated in its cylinder 123 preferably by compressed air introduced into the ends of the cylinder by way of inlet pipes 126, 127 (FIG. 23) which lead from a control slide valve housing 128 enclosing a slide valve 129. One end of the slide valve 129 is under pressure of a compression spring 131 while the opposite end is provided with a solenoid core 132 surrounded by an electric solenoid 133. Vents 134, 135 in the valve housing 128 are provided for the respective inlet pipes 126, 127.

Through reciprocation of the piston 122 in its cylinder 123, the rack 117 is shifted at the proper time to rotate the meshing gear 116 and thus actuate the gate chains 101 to open or close the gate 46. In the position of the gate as shown in FIGS. 3a, 6 and 7, the gate bars 102 are disposed along the inner runs of the chains, i.e., adjacent the entrance to the unloading station D, and thus extend across the path of travel of a carrier B on the feed-in conveyor 45 to stop the carrier and thus block its entrance into the unloading station. To facilitate this blocking action, the inner runs of the gate chains 101 operate in stationary vertically disposed guides 137.

When the unloading station is ready to accept the carrier B, the gate 46 is opened by a forward movement of the rack 117. Fig. 23 illustrates the rack 117 in this forward position. This movement of the rack 117 causes the gate chains 101 to travel in a counterclockwise direction as viewed in FIGS. 3a and 23 and to thus carry the gate bars 102 upwardly over the top of the upper sprockets 104 where the bars are clear of the carrier. This withdrawal of the gate bars 102 releases the carrier B and thus permits the feed-in conveyor 45 to advance the carrier into position on the unloading conveyor 48 for entrance into the unloading station D.

The shifting of the rack 117 into its forward position as viewed in FIG. 23 is effected by an energization of the electric solenoid 133 through the closing of the electric switch 51 at the unloading station. The switch 51 is held open by any containers above the lowermost layer at the unloading station so that until the switch is closed no new carrier is required at the station. When the station needs a new carrier, the switch is closed by lowering of the last layer of a stack onto the conveyor 48 or when the unloading station is empty. The closing of switch 51 permits electric current from a generator 141 to flow along a wire 142, through the solenoid 133, along wires 143, 144 to and through the closed switch 51 and back to the generator along a wire 145. This energizes the solenoid 133 and through its core 132 pushes the slide valve 129 into the position shown in FIG. 23 against the resistance of the compression spring 131.

In this position of the slide valve 129, compressed air from any suitable source flows through connecting pipes 147, 148, 149, 150 through the valve and pipe 126 into the cylinder 123 at the left, to drive the piston forward. The forward end of the cylinder is vented through pipe 127 and vent 135 in the valve housing 128. The piston 122 and hence the rack 117 are held in this position by the air pressure on the piston until the carrier B is fully in place at the unloading station D.

The carrier B is carried into the unloading station by the unloading conveyor 48. This conveyor 48 preferably is a belt conveyor of a width substantially equal to the space between the frames 61 and extends horizontally from the terminal end of the feed-in conveyor 45 to the discharge end of the machine as shown in FIGS. 3a, 3b, 8, 9 and 10. The upper run of the belt operates over and is supported by a flat table 152 which extends transversely between the frames 61. Adjacent the feed-in conveyor 45 the belt conveyor 48 operates over an idler pulley 153 mounted on a cross-shaft 154 carried in bearings in the frames 61. At the discharge end of the machine the belt 48 operates over and is driven by a pulley 155 mounted on a cross-shaft 156 carried in bearings in the frames 61. The lower run of the belt preferably operates over a tightener pulley 157 (FIG. 3b) mounted on a cross-shaft 158 supported in the frames 61.

The unloading belt or conveyor 48 is actuated intermittently through steps of a length substantially equal to the width of a container A for the purpose of advancing the carrier step-by-step into position at the unloading station and to unload the stack of containers layer-by-layer to form a substantially continuous procession of layers on the conveyor as hereinbefore mentioned. This intermittent advancement of the conveyor 48 preferably is effected through a continuously rotating crank disc 161 (FIGS. 1, 11 and 15) on the cross-shaft 85 (FIG. 3b) and a conventional free wheeling clutch 162 on the conveyor pulley shaft 156.

The free wheeling clutch 162 comprises a cylindrical hub 163 (FIGS. 17 and 18) which is keyed to the pulley shaft 156 and which is surrounded by a loose fitting cage 164 having an outwardly projecting arm 165 connected by a rod 166 to the crank disc 161. The outer periphery of the hub 163 is provided with wedge shaped notches 167 which house rollers 168. In operation, the continuously rotating crank disc 161, through its connecting rod 166 rocks the clutch arm 165 through clockwise and counterclockwise (i.e. working and return) oscillations, as viewed in FIG. 15. During a clockwise or working oscillation, the cage 164 wedges the rollers 168 in the notches 167 of the hub 163 and thus rotates the hub and the pulley shaft 156 secured thereto through a partial rotation to advance the unloading belt 48 a predetermined distance, substantially equal to the width of one container A. On the return or counterclockwise oscillation of the clutch arm 165 the cage 164 unlocks the rollers 168, permitting the cage to return to its original position without rotating the hub. In this manner the unloading belt 48 is advanced step-by-step, the width of each row of containers in each layer until a complete layer is removed from the unloading station.

As hereinbefore mentioned the unloading operation requires preliminary steps of closing the gate 46 behind the received carrier, removing the carrier from the containers, lifting the containers in the stack above the lowermost layer, removing the lowermost layer, forming a new lowermost layer and repeating the lifting operation until all of the containers are fed out of the unloading station layer-by-layer.

A carrier B entering the unloading station D is pushed by the feed-in conveyor 45 onto the unloading belt 48 as far as it will go and is then carried into proper position at the unloading station by the belt 48 as it continuously inches forward through intermittent steps of substantially one row of containers at a time until the carrier engages against the locating plate 49 as hereinbefore mentioned. As the carrier engages the plate it also engages and opens the electric switch 51 hereinbefore mentioned. This closes the entrance gate 46 behind the located carrier.

The opening of the electric switch 51, deenergizes the solenoid 133 in FIG. 23 and permits the slide valve spring 131 to push the valve 129 toward the right. This opens the air inlet pipe 126 to vent through the port 134 and establishes air communication from pipe 150 to pipe 127 thereby introducing air into the cylinder 123 at the right of piston 122 to drive the piston back toward the left. This moves the rack 117 toward the left and thus rotates the gate sprockets and gears in a clockwise direction to close the gate bars 102 across the path of travel of the carriers at the entrance end of the unloading station.

The return movement of the rack 117, toward the left as viewed in FIG. 23 sets in motion devices to lower the carrier removal device 53 onto the located carrier to strip it from its containers and also closes an auxiliary gate 171 (see also FIG. 3a) adjacent the discharge end of the unloading station D to prevent premature advancement of the containers due to the continued intermittent movements of the unloading belt 48 during the carrier removal operation. These devices are activated by a lug 172 (FIGS. 23 and 3a) on the rack 117, which lug becomes effective near the end of the gate closing stroke of the rack.

A description of the carrier removal device 53 will first be given. This device comprises a vertically reciprocable head member 174 (FIGS. 1, 2, 3a, 20, 21, 22) which extends across the machine at the unloading station D above the path of travel of the carriers. This head member 174 is secured to the lower end of a vertically disposed piston rod 175 having a piston 176 (see FIG. 23) which operates in a fluid pressure cylinder 177. The cylinder 177 is supported on a horizontal platform 178 secured to the upper ends of two pairs of adjacently disposed spaced and parallel vertical posts 181, 182 which are similar to the posts 108 and which are located one pair on each side of the machine in lateral alignment with the posts 108.

The head member 174 normally is held in a position above the path of travel of the carriers B by a fluid pressure medium 183 (FIG. 23), preferably oil, introduced into the cylinder 177 near its bottom end by a feed pipe 184 which leads from a reservoir 185 carried on the upright posts 181, 182 as shown in FIGS. 1 and 2. The upper end of the reservoir 185 is connected by an air pipe 187 to one side of a slide valve housing 188 containing a slide valve 189 normally disposed in the position shown in FIG. 23. The valve 189 is formed with a pair of vent channels 191, 192 one or the other of which is always in communication with a vent port 193 in the housing 188.

In the normal position of the slide valve 189 as shown in FIG. 23, the reservoir air pipe 187 is in communication with an air feed pipe 194 which connects with the main air supply pipe 147. Thus the compressed air from pipe 147 exerts a direct force or pressure on the oil in the reservoir 185 and thus forces the oil through the reservoir feed pipe 184 into the cylinder 177 and against the lower face of the piston 176 to maintain the piston and the head member 174 in their elevated normal positions.

When the entrance gate 46 closes, after admitting a carrier into the unloading station D, the air pressure on the oil in the reservoir 185 is dissipated through the vent channel 191 in the slide valve 189 and this permits the head member 174 to fall gently by gravity into place on top of the located carrier B. This gentle descent of the head member 174 is effected by its own weight and that of the piston 176 forcing the oil out of the cylinder 177 and back into the reservoir 185. This action is initiated by the lug 172 on the gate closing rack 117 as the latter closes the gate 46 as mentioned hereinbefore.

The lug 172 in moving toward the left as viewed in FIG. 23 engages and momentarily depresses a normally spring closed one-way valve 196 having its inlet side connected to the pipe 149 and having its outlet side connected by a pipe 197 to one end of the slide valve housing 188 (the end at the left as viewed in FIG. 23). Upon depression of the one-way valve 196, compressed air from the pipe 149 passes through the valve 196 and the pipe 197 to push the slide valve 189 toward the right as viewed in FIG. 23. In this position of the slide valve 189, the vent channel 191 in the valve establishes communication between the reservoir pipe 187 and the vent port 193 in the valve housing 188 and thereby dissipates the pressure in the reservoir to permit lowering of the head member 174.

This same shifting of the slide valve 189 out of its normal position, closes the auxiliary gate 171, and opens gripping devices on the head member 174, simultaneously with the lowering of the member in preparation for the stripping of the carrier off the containers therein.

The carrier gripping devices preferably are a plurality of vacuum cups 201 (FIGS. 3a, 20, 21, 22, 23) which are arranged in two opposing sets located at the outer ends of the head member 174 for engagement against two opposed sides of the carrier B near its top end. These vacuum cups 201 are connected to any suitable source of vacuum. The cups 201 are mounted in elongated tubular heads 202 (FIG. 20) having upright arms 203 pivotally connected to the ends of the head member 174. One of the arms 203 on each head 202 is longer than the others and these two arms are loosely connected by horizontal links 204 to opposite sides of a vertical, oscillatable collar 205 mounted on a pivot screw 206 threadedly engaged in the top of the head member 174. One of the links 204 is connected to an actuating device comprising a piston rod 207 having a piston 208 (see FIG. 23) operating in an air cylinder 209 mounted on the head member 174.

By reference to FIG. 23 it will be noted that one end (at the right) of the cup cylinder 209 is connected by an air pipe 211 to the reservoir air pipe 187, and the opposite end (at the left) of the cylinder is connected by an air pipe 212 to a pipe 213 that leads from the slide valve housing 188. Hence in the shifted position of the slide valve 189 (at the right as viewed in FIG. 23) compressed air flows from pipe 194 through the slide valve 189, pipes 213, 212 into the cup cylinder 209 and pushes the piston 208 toward the right. The portion of the cylinder ahead of the piston is vented through pipes 211, 187, vent channel 191 in the slide valve 189, and vent port 193 in the valve housing 188. This movement of the piston shifts the cup connecting links 204 in opposite directions (toward each other) to swing the cup heads 202 outwardly as shown in FIG. 22 to thereby spread the opposing vacuum cups 201 apart so that they will readily straddle the located carrier B when the head member 174 comes to rest on top of the carrier.

The closing of the auxiliary gate 171 is effected by compressed air from the same pipe 213 that feeds the cup cylinder 209. Air from this pipe 213 flows through a branch pipe 215 of pipe 212 and enters a gate cylinder 216 (FIGS. 3a and 10) attached to the unloading station locating plate 49. The cylinder 216 contains a piston 217 (FIG. 23) carried on a piston rod 218, the lower end of which slides in a slot in a short arm 221

(see also FIGS. 3a and 10) mounted on a pivot shaft 222 carried in bearings 223 on the locating plate 49. The locating plate 49 in turn is supported on the upright posts 182 as shown in FIG. 10. The pivot shaft 222 carries a pair of spaced arms 224 which are attached to the auxiliary gate 171. This shaft 222 also carries a pair of upright arms 225 which are attached to a crosspad 226 disposed in an opening 227 in the locating plate 49 for operating the electric switch 51 hereinbefore mentioned.

Hence when the compressed air enters the auxiliary gate cylinder 216 (FIG. 23) it pushes the piston 217 down and thereby closes the auxiliary gate 171 into a position depending from and forming a lower continuation of the locating plate 49 (see dotted position in FIG. 10) to hold the lower layer of containers in the stack in place while the carrier is being stripped off. During this downward movement of the piston 217, the lower end of its cylinder is vented through a pipe 229 (FIG. 23) and a connecting pipe 231 which leads to a vent channel 232 in a timing slide valve 233 in a housing 234 having a vent port 235.

With the auxiliary gate 171 closed, the vacuum cups 201 spread apart, and the head member 174 resting on the carrier B, the direction of flow of the compressed air is reversed to close the vacuum cups 201 against the sides of the carrier and to lift the head member 174 so as to strip the carrier off the stack of containers therein. This reversal of the flow of air is effected by shifting the slide valve 189 back into its normal position as shown in FIG. 23. The shifting of the slide valve 189 is effected by a lug projection 237 (see also FIG. 3a) which extends from the head member piston rod 175 and during the down movement of the head member 174 passes a normally closed one-way spring loaded valve 241 without operating it and at the lowest point in its down travel engages and opens a normally closed one-way spring loaded air valve 242.

The first one-way air valve 241 is connected to a source of compressed air through a pipe 240 which continually feeds air to a supply pipe 243 connecting valve 241 with valve 242. When the second one-way valve 242 is opened by engagement of the lowered head member projection lug 237 (as shown in dotted lines in FIG. 23), air from the supply pipe 243 passes through the valve 242 into a pipe 245 connecting with the end of the slide valve housing 188 at the right as viewed in FIG. 23, and this air pushes the slide valve 189 back into its original position as mentioned above, the valve housing at the left being vented through pipe 197, one-way valve 196 and a vent port 246 in this latter valve.

The return of the slide valve 189 to its normal position as shown in FIG. 23 returns communication between the air supply pipes 147, 194 and pipe 187 to the oil reservoir 185 and by way of branch pipe 211 to the right end of the cup cylinder 209. Air entering the cup cylinder 209 at its right end pushes the piston 208 toward the left and thus closes the vacuum cups 201 against the sides of the carrier B, the left end of the cylinder being vented through pipes 212, 213, vent channel 192 in the slide valve 189 and vent port 193 in the valve housing 188. The vacuum in the cups 201 through their connection with a source of vacuum causes the cups to grip and hold the carrier. The cups 201 preferably are continuously vacuumized.

Compressed air entering the oil reservoir 185 produces a pressure on the oil in the reservoir and forces it out into the head member cylinder 177 through its connecting pipe 184. This oil lifts the piston 176 in the cylinder 177 and thereby raises the head member 174 to its normal elevated position. This action strips the carrier B off the containers A leaving the containers in a stack formation of a plurality of layers resting on the intermittently moving unloaded conveyor 48 but held back from advancement with the conveyor by the locating plate 49 and the still closed auxiliary gate 171 as shown in FIG. 3a. This carrier stripping operation is effected rapidly and usually is completed while the conveyor 48 operates through one stepped movement so that there is a space between unloaded layers of not more than one row of containers. The slit or flap C in the carrier permits of easy removal from the containers without forming a vacuum within the carrier. Upon removal, the carrier preferably is manually torn away from the vacuum cups and is discarded.

With the carrier B stripped off the containers, the latter are removed from the stack and advanced by the conveyor belt 48 from the unloading station layer-by-layer as hereinbefore mentioned, the upper layers being lifted free of the lowermost layer by the clamping device 55 to permit unrestricted movement of the lowermost layer. The clamping device 55 preferably comprises a pair of clamping heads 251 (FIGS. 8, 9, 19 and 23) disposed one on each side of the machine at the unloading station D and normally located at a level adjacent the two or more upper layers of containers above the lowermost layer in the stack. Since by way of example, the drawings show only three layers of containers in the stack, the machine is designed to operate on only three layers although it should be understood that the invention is readily adapted to stacks of more than three layers.

The clamping heads 251 operate on only those layers of containers above the lowermost layer. Hence for a three layer stack, the clamping heads 251 are fitted with two horizontally disposed clamping plates 252 (see FIG. 19) one for each of the upper layers of containers. These plates 252 are secured to bosses 253 on the clamping heads. The bosses 253 preferably have inclined faces to hold the plates 252 at a slight incline, with the lower edges of the plates disposed inwardly to engage the containers first and thereby act like a supporting wedge for the containers.

The clamping heads 251 are carried in vertically movable brackets 255 (FIGS. 8, 9 and 19) which are slidably mounted on the upright posts 108, 181. Movement of the brackets 255 is effected through connecting rods 256. The upper ends of the rods are pivotally connected to their respective brackets, while the lower ends are pivotally attached to two crank discs 257 carried on the outer ends of an actuating shaft 258 extending across the machine and journaled in bearings 259 in the machine frames 61. The shaft is oscillated in opposite directions periodically in time with the other parts of the machine as will be hereinafter explained.

One of the clamping heads 251 (at the right as viewed in FIG. 8) is fixed against horizontal movement, to its slide bracket 255. The opposite clamping head 251 is movable horizontally toward the fixed head to clamp the upper two layers of containers simultaneously between them. For this purpose, the clamping head 251 at the left in FIG. 8 (see also FIG. 19) is mounted on the inner end of a piston rod 261 (see also FIG. 23). The piston rod 261 carries a piston 262 which operates in an air cylinder 263 attached to the adjacent slide bracket 255 for movement therewith.

The piston 262 normally is in the position shown in FIG. 23, holding the movable clamping head 251 in a retracted position. The piston is held in this position by compressed air introduced into the cylinder 263 (at the right of the cylinder as viewed in FIG. 23) by way of a pipe 265 and a connecting pipe 266 which leads from a slide valve housing 267 and which communicates with the supply pipe 148 through a slide valve 268 in the housing 267. The slide valve 268 is provided with vent channels 271, 272 which alternately register with a vent port 273 in the valve housing.

The normal position of the slide valve 268 is shown in FIG. 23. At the proper time, the slide valve is shifted toward the left into a position which cuts off communication between the air pipes 148, 266 and vents pipe 266 through vent channel 272, and port 273 and establishes communication between the supply pipe 148 and a short pipe 275 which connects with a pipe 276 which at one end connects with the clamping cylinder 263 (at the left as viewed in FIG. 23) and which at its opposite end connects with the slide valve housing 234 hereinbefore mentioned (at the right in FIG. 23). In this position of the slide valve 268 air is introduced into the clamping cylinder 263 to push the piston 262 and its clamping head 251 toward the containers in the two layers above the lowermost layer in the stack to clamp these two layers firmly between the two clamping heads 251.

Shifting of the slide valve 268 to effect this clamping action is timed with the removal of the carrier B from the containers, and is effected near the peak position of carrier removal device 53 as the latter strips off the carrier. Near this peak position the lug projection 237 carried on the head member piston rod 175 engages against and opens the normally closed one-way valve 241 (at the right in FIG. 23). Opening of this valve permits air from the supply pipe 240 to flow through a pipe 278 which connects with a two-way spring loaded valve 279 which is normally closed on one side (the left as in FIG. 23) and normally open on the other side to a pipe 282 which connects with a pipe 283. One end of the pipe 283 connects with the slide valve housing 267 to direct compressed air against the slide valve 268 to shift it into the position mentioned above (at the left in the housing 267). The other end of the pipe 283 connects with the slide valve housing 234 (at its left end as viewed in FIG. 23) to shift its slide valve 233 toward the right in FIG. 23 to set in motion certain devices which lift the two clamped layers of containers free of the lowermost layer to permit advancement of the lowermost layer as explained hereinbefore.

The initial lifting of the clamped layers of containers is effected by a partial rotation of the shaft 258 and the crank discs 257 connected by the connecting rods 256 to the slide brackets 255 carrying the clamping heads 251. It will be remembered that while the clamping heads 251 hold the upper layers of containers clamped between them, they first move up just far enough to clear the upper layers relative to the lowermost layer, then hold the containers suspended while the lowermost layer is removed, then move down after the lowermost layer is clear to rest the stack on the conveyor 48. The clamping heads 251 are then unclamped and are moved up a distance equal to the height of the lowermost layer of containers, then are reclamped against the remaining one layer of containers above the new lowermost layer in readiness for a repeat cycle of operation. Thus the actuation of the clamping heads 251 involves three vertical movements for each cycle, first a short up movement, then a long down movement, and then a slightly less up movement. These movements are effected by partially rotating the connecting rod pivot points on the crank discs 257 first in a counterclockwise direction from Y to Z in FIGS. 13 and 24, then in a clockwise direction from Z to X, and then in a counterclockwise direction from X to Y thus returning to the starting point of the cycle.

The partial rotations of the crank discs 257 in the proper direction and degree are effected by a pair of longitudinally aligned air cylinders 286, 287 and by sequential operation of the slide valves 233, 268 (in the lower portion of FIG. 23) which are connected to the cylinders and control them. Cylinder 286 is a double cylinder and contains two pistons 291, 292, one in each portion of the cylinder and both mounted on a common piston rod 293 attached to a rack 294 outside the cylinder. The ends of the portion of the cylinder containing the piston 291 are connected by a pipe 295 which serves to convey air from one end of the cylinder portion to the other as the piston 291 moves to act as a cushion for the piston 292.

The portion of the cylinder containing the piston 292, at one end (the left in FIG. 23) is connected by the pipe 231 to the slide valve housing 234 and is normally vented through the channel 232 in the slide valve 233. The opposite end of the cylinder (at the right in FIG. 23) is connected by a pipe 297 to the valve housing and normally is in comumnication through the slide valve 233, with the air supply pipe 276 from slide valve 268. However slide valve 268 normally cuts off air from the pipe 276 hence there is no pressure on either side of the piston 292 in its cylinder 286. The normal position of the piston 292 is spaced from the end of the cylinder (at the right end) 286 as shown in FIG. 23 and constitutes the starting point Y in the cycle of operation, so as to shift toward this end to effect the initial rotation of the crank discs 257 from point Y to point Z hereinbefore mentioned.

The oppositely disposed cylinder 287 contains a piston 301 attached to a piston rod 302 the outer end of which is provided with a resilient bumper 303 which normally engages against the outer end of the rack 294 as shown in FIG. 23, when the piston 301 is in its normal position at the end of the cylinder 287. The cylinder 287 is supplied with air from one end only (the left in FIG. 23) by way of the pipe 266 which in the normal position of the slide valve 268 is in communication with the main supply pipe 148 and is receiving air therefrom to retain the piston 301 in its normal position.

When the slide valve 268 is shifted out of its normal position (toward the left in FIG. 23) to effect the actuation of the clamping heads 251, the air is cut off from pipe 266 and the cylinder is vented through channel 272 in the slide valve 268. It should be remembered that this shifting of the slide valve 268 toward the left as viewed in FIG. 23 was effected when the carrier removal head 174 reached the peak of its up travel and through its lug projection 237 momentarily opened the one-way valve 241 and thereby introduced air through the two-way valve 279 into the pipe 283 leading to the slide valve 268. This same air in pipe 283 also shifted the oppositely disposed slide valve 233 toward the right in FIG. 23. Thus both slide valves 268, 233 are now out of their normal positions.

Slide valve 268 in its new position establishes communication between the main air supply pipe 148 and the short pipe 275 as mentioned hereinbefore and through this connection, not only initially operates the clamping heads 251 as mentioned above, but also introduces air through pipe 276 into the slide valve 233 and communicating pipe 231 into the cylinder 286 for action against the piston 292. This air drives the piston 292 toward the right as viewed in FIG. 23 and through this movement of the rack 294 connected thereto rotates the crank discs 257 in a counterclockwise direction from Y to Z in FIGS. 13 and 24 to elevate the clamping heads 251 and the two top layers of containers free of the lowermost layer as shown in FIG. 8. This same air introduced into pipe 231 also flows through the connecting pipe 229 into the auxiliary gate cylinder 216 and pushes its piston 217 upwardly to open the hereinbefore closed auxiliary gate 171 and thus permits the freed lowermost layer of containers to advance with the unloading conveyor 48 as it moves forward through its step-by-step advancement as hereinbefore explained.

Rotation of the crank discs 257 is effected by a spur gear 311 (FIGS. 3a, 8, 13 and 23) which is carried on the crank disc shaft 258 and which meshes with the rack 294 actuated by piston 292. Adjacent the gear 311 the shaft 258 carries a depending clevis bracket 312 (FIGS. 3a and 8) provided with support rollers 313 for the rack 294 to insure continued meshing engagement between the gear and the rack.

When the lowermost layer of containers advancing with the conveyor 48 is clear of the unloading station D, i.e. after the conveyor 48 has moved forward through as many steps as there are transverse rows of containers in the layer, in this case 8, the clamping heads 251 holding the two upper layers of containers are moved down, through a clockwise rotation of the crank discs 257 from point Z to point X (FIG. 13) to rest the stack of containers on the conveyor 48 to form a new lowermost layer. This clockwise rotation of the crank discs 257 is effected by a movement of the rack 294 and its connected piston 292 toward the left as viewed in FIG. 23. For this purpose the slide valve 233 is returned to its normal position as shown in FIG. 23 so as to introduce air from pipe 276 through the valve into pipe 297 for introduction into the cylinder 286. During these movements the opposing slide valve 268 remains in its out-of-normal position to keep air pressure on the clamping heads 251.

Movement of the slide valve 233 back into its normal position is effected by air taken from the main supply pipe 148 by a connecting pipe 315 (at the bottom of FIG. 23) which connects with a normally closed spring loaded one-way valve 316, a pipe 317, an electrically operated normally open one-way valve 318, and a pipe 319 which connects with the slide valve housing 234 at the right end as viewed in FIG. 23. The normally closed valve 316 is controlled by an edge cam 321 mounted on the continuously rotating cam shaft 85. Since the shaft 85 makes one revolution for each intermittent advancement of the unloading conveyor 48, the valve 316 is opened for each cycle of stepped movement of the conveyor but only when the conveyor is at rest so that the stack of containers can be deposited on the belt 48 while it is at rest as shown in FIG. 9.

The opening of this valve 316 alone will not effect operation of the slide valve 233. The electrically operated valve 318 must also be open and although this is a normally open valve, it is closed while containers are being unloaded from the unloading station D. It is only when the layer of containers being removed from the station is clear of the station that the valve 318 opens. For this purpose a beam of light 325 (FIG. 23) from a source of light 326 is projected angularly across the path of travel of the containers from a point just beyond the auxiliary gate 171 to a point substantially under the carrier locating plate 49, a distance substantially equal to the width of two containers as viewed in FIG. 3a. The beam of light 325 is projected into an electric eye or photoelectric cell amplifying unit 328 (FIG. 23) which is connected by wire 145 to the electric generator 141 and by a wire 331 to a solenoid 332 surrounding a movable core attached to the one-way valve 318. The solenoid 332 is also connected by a wire 333 to the generator 141. The solenoid 332 is energized from the beam of light received by the unit 328.

Hence when a layer of containers is advanced step-by-step by the conveyor belt 48 from the unloading station D, the containers intercept the beam of light 325 and thus cause the amplifying unit 328 to deenergize the solenoid 332 which in turn permits the valve 318 to close and remain closed until the layer of containers advances beyond the beam of light. With this valve 318 closed compressed air from the one-way valve 316 when it is opened by cam 321 is prevented from reaching the slide valve 233. In this manner the slide valve 233 is prevented from shifting, to set in motion the crank discs 257 to lower the stack of containers onto the conveyor belt 48, until the outgoing lowermost layer is completely clear of the unloading station and the conveyor belt is at rest.

As soon as the two clamped layers of containers are at rest on the conveyor belt 48, the clamping heads 251 release the containers and the heads are moved up one container height to complete the cycle of operation of unloading the lowermost layer. To release the clamping heads 251, the slide valve 268 is returned to its normal position as shown in FIG. 23. This is effected by a cam lug 335 on one of the crank discs 257. The lug is so located that at the end of the clockwise rotation of the disc from point Z to point X (FIG. 13), it engages and opens a normally closed spring loaded one-way valve 336 (FIG. 23) and thereby permits air to flow from a pipe 337 connecting with pipe 148, into a pipe 338 connecting with the slide valve housing 267 at the left as viewed in FIG. 23. This air returns the slide valve 268 to its normal position as shown and thereby connects air pipe 148 to pipe 266 and pipe 265 to introduce air into the clamping cylinder 263 to push the piston 262 into the unclamping normal position shown in FIG. 23.

The lifting of the unclamped heads 251 to the upper layer of containers immediately follows the unclamping action and is effected by air from the pipe 266 entering the cylinder 287. The piston 301 in this cylinder by reason of the engagement of its rod 302 with the rack 294 was pushed back to the left end of the cylinder when the rack 294 shifted toward the left to oscillate the crank discs 257 through their clockwise movement from Z to X. The piston 301 is now pushed forward to the right in FIG. 23 for the full length of the cylinder and in so doing it pushes the rack 294 and its piston 292 part way back to effect the counter-clockwise oscillation of the crank discs from X to Y and to leave the piston 292 in its cylinder 286 in a position for the further counterclockwise oscillation of the crank discs 257 from Y to Z in the next or repeat cycle. This completes the cycle of operation in unloading the first lowermost layer of containers.

In order to start a repeat cycle of operation to unload the next lowermost layer and each lowermost layer thereafter until the stack is fully unloaded, without benefit of the lug projection 237 on the carrier removal head 174 and the one-way valve 241 actuated thereby, provision is made to open the normally closed portion of the two-way valve 279 to admit air from the pipe 337 into the pipe 282 to push both slide valves 233, 268 into their out-of-normal positions shown in FIG. 23 to reestablish air communication with the clamping cylinder 263 to re-clamp the upper layer of containers in the stack and to reestablish air communication with cylinder 286 to push its piston 292 to lift the clamped layer of containers free of the lowermost layer to permit unloading of the latter as explained above.

Opening of the two-way valve 279 to effect these operations is effected in time with the oscillations of the crank discs 257 and only near the end of the second counterclockwise movement when the discs shift from X to Y as in FIG. 13. This actuation of the valve 279 preferably is brought about by an edge cam 341 (FIGS. 3a, 9, and 13) having a valve actuating lug 342. The cam is carried on a rotatable shaft 343 journaled in a bearing 344 (FIG. 9) on the frames 61.

The cam 341 is formed with a holding notch 346 in which is engaged a spring held pawl 347 mounted on a bracket 348 extending from the two-way valve 279. The notch 346 is retained in engagement with the pawl 347 to hold the cam lug 342 in a predetermined relation to the valve 279, by a tension spring 351 one end of which is secured to a bracket 352 attached to the frames 61. The opposite end of the spring 351 is attached to a pin 353 secured in the side of the cam 341 in an eccentric position below the horizontal center line of the shaft 343 as shown in FIGS. 13 and 24.

The cam 341 is adapted to be oscillated in counter-clockwise and clockwise directions and for this purpose its shaft 343 carries a sprocket 355 which is rotated by an endless chain 356 operating over a sprocket 357 on a sleeve 358 loosely surrounding the crank disc shaft 258. The sleeve 358 at one end is formed with a collar 361 having two adjacent successively spaced peripheral notches 362, 363 (see FIG. 24). The collar 361 is located adjacent a disc 365 which is secured to the crank disc shaft 258 and which carries a spring held pawl 366 which normally engages in the collar notch 362 as shown in FIGS. 13 and 24.

FIGURES 24 to 28 inclusive diagrammatically illustrate the relation of the above parts during a cycle of operation. When the crank disc shaft 258 rotates in a counterclockwise direction from Y to Z (FIG. 24) to raise the upper layers of the stack clear of the lowermost layer as shown in FIG. 31, the disc 365 moves the pawl 366 from the position shown in FIG. 24 to that shown in FIG. 25. In so doing, the pawl, through the notch 362 in collar 361 rotates the sleeve 358 in the same counterclockwise direction and thus through the chain 356 and sprockets 357, 355 rotates the cam 341 in a counterclockwise direction until the spring pin 353 rotates up past the center line of the cam shaft 343. The spring 351 then suddenly pulls the pin 353 and the cam 341 through a further half revolution of the cam in a counterclockwise direction until the cam is in the position shown in FIG. 25. Of course this rotation of the cam also rotates the collar 361 through the extra half revolution in a counterclockwise direction to position the collar notch 363 as shown in FIG. 25 in readiness for the next step in the cycle.

The next step in the cycle of operation is when the crank disc shaft 258 oscillates back through a clockwise direction from Z to X to lower the stack of containers onto the conveyor 48 as shown in FIG. 32. This backward oscillation of the shaft 258 rotates the disc 365 and its pawl 366 clockwise into the position shown in FIG. 26 where the pawl is brought to rest adjacent the notch 363 in the collar 361. The chain 356 and its sprockets 357, 355 and hence the cam 341 remain at rest during this action.

Upon the next step in the cycle, when the crank disc shaft 258 oscillates through its second counterclockwise direction from X to Y to raise the clamping devices 251 into position adjacent the upper layers of the lowered stack as shown in FIG. 33, the pawl 366 on disc 365 engages in the notch 363 of the collar 361 and thus rotates the collar and its sleeve 358 in a counterclockwise direction with the crank disc shaft 258, into the Y position as shown in FIG. 27. This rotation of the sleeve 358 rotates the sprockets 357, 355 in a counterclockwise direction and thus rotates the cam 341 in the same direction from the position shown in FIG. 26 to the position shown in FIG. 27 where the cam lug 342 engages and thereby opens the two-way valve 279.

The opening of the two-way valve 279 causes compressed air to flow from pipe 337 into pipes 282, 283 to again push the slide valves 268, 233 into their out-of-normal positions to reclamp the clamping head 251 against the top or third layer of containers and to lift this reclamped layer clear of the second layer to start a new cycle of operations for this top layer. This effects the rotation of the crank discs from Y to Z as before, as shown in FIG. 28 and thus shifts the cam lug 342 of cam 341 away from the two-way valve 279 to close the valve and thus reset the system for the remainder of the cycle, the cam 341 being returned to its original position as shown in FIGS. 28 and 24. The cam 341 and the collar 361 remain in these original positions during the remainder of the cycle on the third or top layer of containers, while the crank discs 257 rotate clockwise from Z to X to lower the third layer onto the conveyor belt 48 for unloading and then rotate counterclockwise from X to Y to unclamp and raise the clamping heads 251 above the lowermost layer as before. Since this third layer of containers is the last in the stack, the clamping heads 251 are left in their unclamped and raised position, in readiness for the next incoming carrier B with its load of containers A. This completes the cycles of operation involved in unloading a stack of containers from the unloading station D.

As a safety precaution against damaging containers entering and leaving the unloading station D provision is made for retarding the closing of the entrance gate 46 and preventing the auxiliary gate 171 from closing down on the containers. For this purpose a beam 371 of light (FIG. 23 at the right) is projected from a light source 372 across the path of travel of containers leaving the unloading station D. This beam 371 of light is located adjacent the outer end of the auxiliary gate 171 and is directed into a normally open photoelectric cell, amplifying unit 374. The unit 374 is connected by a wire 375 to the wire 144 of the electric circuit which includes the electric switch 51 and the solenoid 133 which controls the entrance gate actuating slide valve 129. The unit 374 is also connected by a wire 376 to a switch 377 (at the left in FIG. 23) which is held closed by the lug 172 on the entrance gate actuating rack 117, when the entrance gate 46 is open. The switch 377 is also connected by a wire 378 to the generator 141.

Hence while containers A are moving out of the unloading station D, they intercept the beam 371 of light and maintain the amplifying unit 374 closed and thus keep the solenoid 133 in an energized condition until the containers are clear of the unloading station. This prevents actuation of the entrance gate actuating slide valve 129 and also prevents actuation of the one-way valve 196 (adjacent slide valve 129) and the slide valve 189 controlled thereby which in turn controls operation of the auxiliary gate 171. This safetay device is desirable since normally the depositing the last layer of containers of a stack, upon the conveyor belt 48, releases the electric switch 51 and thereby causes it to open immediately, with the result that the solenoid 133 is immediately deenergized and the entrance gate 46 opened to permit the next carrier B to enter the unloading station D. By means of the amplifying unit 374 this opening of the gate 46 is delayed until the last layer of each stack is clear of the unloading station.

As each layer of containers is advanced from the unloading station D, through the stepped movement of the unloading conveyor 48, it moves forward with the previously unloaded layers to form on the conveyor, beyond the unloading station, a substantially continuous procession of containers which step-by-step advance toward the discharge end of the machine for discharge row-by-row into the discharge device 59 (FIGS. 1 and 2). For this purpose the machine is provided with a transfer device 57 (FIGS. 1 and 2) which is located at the terminal end of the unloading conveyor 48 and which picks off the containers row-by-row and places them into the discharge device 59. Guide rails 380 disposed along the path of travel of the containers keep them in line.

The transfer device 57 is actuated in time with the step-by-step advancement of the unloading conveyor 48 and primarily comprises a hinged right angularly shaped tray 381 (FIGS. 3b, 11, 14 and 16) having a bottom plate 382 in the plane of the conveyor belt 48 and an upright stop plate 383, both of which extend transversely of the machine at the terminal end of the conveyor belt. A stationary short table 385 (FIG. 3b) between the belt and the tray facilitates advancement of the containers from the belt to the tray. The bottom plate 382 of the tray 381 is provided with hinged lugs 386 which are mounted on a rocker shaft 387 carried in bearings formed in the machine frames 61.

The normal position of the tray 381 is shown in full lines in FIG. 3b. In this position, the conveyor belt 48 pushes the leading row of containers onto the tray and into abutting engagement with its stop plate 383. As soon as a row of containers is received on the tray, the row is clamped in position, at its ends, by a pair of movable clamp pads 391, 392 (FIGS. 14 and 16). The clamp pad 391, in an endwise direction, is yieldably mounted on a bracket 393 attached to a transversely movable slide 394 (see also FIGS. 3b and 11) carried in a pair of spaced lugs 395 projecting from the stop plate 383 of the tray 381.

At its inner end, the slide 394 is pivotally connected to a link 396 which is attached to a bell-crank lever 397 which carries the clamp pad 392. The bell-crank lever 397 is pivoted on a lug 398 on the stop plate 383 of the tray. A tension spring 399 having one end attached to the slide 394 and the other end attached to the stop plate 383 of the tray, urges the slide outwardly as viewed in FIG. 16, and thereby normally holds the clamp pads 391, 392 in a separated relation as shown in FIG. 16 to permit entrance of the row of containers into position on the tray.

The clamping of the row of containers, by an inward movement of the clamp pads 391, 392 against the ends of the row is effected by the introduction of a blast of compressed air into a cylinder 401 (FIGS. 11, 14 and 16) attached to the tray 381. This cylinder contains a piston 402 having a piston rod 403 which outside of the cylinder carries an upright pin 404 secured to the slide 394. Air is introduced into a cylinder 401 through a feed pipe 405 which connects with a one-way valve 406 (FIG. 11) connected to a source of compressed air and actuated at the proper time through an edge cam 407 mounted on and rotating with the cam shaft 85.

When the row of containers is fully clamped in the tray 381, the tray is hinged forward into the tilted position of the containers as shown in dotted lines in FIG. 3b. This is affected through cam action. For this purpose, the tray cross-shaft 387 carries a lever 411 (see also FIG. 11) which is connected by a link 412 to the lower end of a depending lever 413 disposed adjacent the cam shaft 85. The lever at its upper end is carried on a pivot shaft 415 which extends across the machine and at its ends is carried in bearings in the frames 61. Intermediate its length, the lever 413 carries a cam roller 416 which operates against an edge cam 417 mounted on and rotating with the cam shaft 85. Through this medium the tray 381 is rocked in time with the stepped advancement of the unloading conveyor 48. When the tray has reached its limit of tilt, the clamp pads 391, 392 are retracted to release the containers.

While the leading row of containers in the procession of layers is on the tray 381, the following containers are held against further advancement by a stop gate 421 (FIGS. 3b, 11 and 14) which extends across and normally above the path of travel of the containers at the tray 381. This stop gate 421 is suspended from a pair of spaced arms 422 attached to a cross-shaft 423 having its ends journaled in a pair of bearing brackets 424 carried on the upper ends of a pair of spaced support posts 425 secured in support blocks 426 attached to the machine frames 61. One of the arms 422 is provided with an oppositely directed short lever 428 (FIG. 14) which is connected to a link 429, the lower end of which is pivotally attached to a cam lever 431 mounted on a pin 432 secured in the adjacent frame 61 (see also FIG. 11). The cam lever 431 carries a cam roller 433 which operates against an edge cam 434 on the cam shaft 85. Hence as the cam shaft 85 rotates, it rocks the stop gate 421 into the dotted line position in FIG. 14, at the proper time to hold back the procession of containers while the leading row is being transferred to the discharge device 59.

The discharge device 59 (FIGS. 3b and 12) comprises a horizontally disposed endless chain conveyor 437 which extends across the discharge end of the machine with its inner run adjacent the row of containers resting in a tilted position on the transfer tray 381 as best shown in FIG. 3b. A support rail 438 is disposed immediately above the inner run of the conveyor 437 to support the containers in their tilted position.

The discharge conveyor 437 operates over a pair of spaced, horizontal sprockets 441, 442 mounted on vertical shafts 443, 444 which are journaled in bearings attached to the machine frames 61. The shaft 444 is the driving shaft and at its lower end carries a bevel gear 445 which meshes with and is driven by a bevel gear 446 carried on a short shaft 447 journaled in a bearing in the frame 61 and in a bearing in a bracket 448 attached to the frame. The short shaft 447 is rotated continuously by an endless chain 451 which operates over a sprocket 452 on the short shaft 447 and over a sprocket 453 on the main driving shaft 89.

The discharge conveyor 437 carries one or more discharge fingers 455 (FIG. 3b) which project horizontally from the conveyor and which engage against one end of the tilted row of containers as the finger travels with the conveyor, in time with the tilting of the containers, to push the entire row, endwise in a single line across and out of the machine. The row of tilted containers is received in an angularly positioned trough 456 (FIGS. 1, 3b and 12) which aligns with the tilted position of the tray 381 and which is shaped to turn the containers into a horizontal position as shown in FIG. 12 and discharge them on their sides onto a continuously moving belt 458 which carries them in a substantially continuous single row procession to any suitable place of deposit such as a filling or other subsequent operation machine. The belt 458 operates over suitable pulleys 459 and is driven in any suitable manner.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A machine for unloading rectangular fibre containers from a compact unit of a plurality of juxtaposed and superimposed parallel rows and layers of said containers, comprising in combination an unloading station having a substantially horizontal support for receiving a said unit of containers to be unloaded, means for locating said unit in a predetermined position at said station, means for feeding said unit to said station and locating means, a gate at the discharge end of said station, means for closing said gate to hold said containers in place against premature discharge from said station, clamping means having oppositely facing heads normally disposed at opposite lateral ends of at least the layer next above the lowermost layer of a said unit on said support for engaging at least said ends of the layer and slightly compressing the containers therebetween to support all layers above said lowermost layer, actuating means for moving said clamping means into and out of engagement with the unit above its lowermost layer and for raising said clamping means and the layers of said units supported thereby to space said layers vertically from said lowermost layer on the support and thus release said lowermost layer from the unit, means for opening said gate to permit advancement of said released layer therethrough, advancing means for moving said released layer along a predetermined substantially horizontal path, said actuating means including means for lowering said clamping means and the remaining layers of the unit supported thereby for placing the lowermost of said remaining layers upon said support; whereby said layers of a unit are successively placed upon said support, released from the remainder of the unit and advanced from the support along a predetermined path in a substantially continuous procession.

2. A machine of the character defined in claim 1 wherein said oppositely facing heads of the clamping means are provided with substantially flat faces disposed in upwardly diverging planes whereby the lower portions of said faces engage the containers first and said faces cooperate to effect a wedge-like clamping support to hold the containers therebetween in a slightly arched formation.

3. A machine of the character defined in claim 1 for unloading a said compact unit of containers that is fed to said unloading station while enclosed in a container carrier, carrier removing means at said station for removing said carrier from said unit of containers, and means operatively connecting said carrier removing means with said actuating means for initially moving said clamping means into engagement with said unit only after said carrier has been completely removed from said unit by said carrier removing means.

4. A machine of the character defined in claim 3 wherein said carrier removing means include a vertically reciprocable carrier gripping head having vacuum cups movably mounted thereon, and means cooperating with said actuating means for moving said vacuum cups into gripping engagement with opposite vertical outer surfaces of said carrier close to the upper end thereof and for raising said reciprocable head and the carrier gripped thereby to remove said carrier from said containers.

5. A machine for unloading rectangular fibre containers from a compact unit of a plurality of juxtaposed and superimposed parallel rows and layers of said containers, comprising in combination an unloading station having a substantially horizontal support for receiving a said unit of containers to be unloaded, means for locating said unit in a predetermined position at said station, means for feeding said unit to said station and locating means, an entrance gate at the entrance to said station, means for closing said entrance gate when a said unit is in position for unloading at said station and for holding said gate in closed position until all containers in the unit are unloaded to hold subsequent units of containers against premature entrance into said station, clamping means having oppositely facing heads normally disposed at opposite lateral ends of at least the layer next above the lowermost layer of a said unit on said support for engaging at least said ends of the layer and slightly compressing the containers therebetween to support all layers above said lowermost layer, actuating means for moving said clamping means into and out of engagement with the unit above its lowermost layer and for raising said clamping means and the layers of said units supported thereby to space said layers vertically from said lowermost layer on the support and thus release said lowermost layer from the unit, advancing means for moving said released layer along a predetermined substantially horizontal path, said actuating means including means for lowering said clamping means and the remaining layers of the unit supported thereby for placing the lowermost of said remaining layers upon said support; whereby said layers of a unit are successively placed upon said support, released from the remainder of the unit and advanced from the support along a predetermined path in a substantially continuous procession.

6. A machine of the character defined in claim 5 wherein said entrance gate is a pair of vertically movable members disposed on opposite sides of the path of travel of said containers, said members having transverse elements extending across the path of travel of said containers for obstructing the advancement of said containers into said station.

7. A machine for unloading rectangular fibre containers from a compact unit of a plurality of juxtaposed and superimposed parallel rows and layers of said containers, comprising in combination an unloading station having a substantially horizontal support for receiving a said unit of containers to be unloaded, means for locating said unit in a predetermined position at said station, means for feeding said unit to said station and locating means, entrance and discharge gates at the entrance and discharge ends of said station, respectively, means for closing and opening said gates, clamping means having oppositely facing heads normally disposed at opposite lateral ends of at least the layer next above the lowermost layer of a said unit on said support for engaging at least said ends of the layer and slightly compressing the containers therebetween to support all layers above said lowermost layer, actuating means for moving said clamping means into and out of engagement with the unit above its lowermost layer and for raising said clamping means and the layers of said units supported thereby to space said layers vertically from said lowermost layer on the support and thus release said lowermost layer from the unit, advancing means for moving said released layer out of said station and along a predetermined substantially horizontal path, means for delaying the opening of said entrance gate and the closing of said discharge gate until containers moving out of said station are clear of said station, said actuating means including means for lowering said clamping means and the remaining layers of the unit supported thereby for placing the lowermost of said remaining layers upon said support; whereby said layers of a unit are successively placed upon said support, released from the remainder of the unit and advanced from the support along a predetermined path in a substantially continuous procession.

References Cited in the file of this patent

UNITED STATES PATENTS

| 1,453,720 | Nitsch | May 1, 1923 |
| 1,519,736 | Lewis | Dec. 16, 1924 |
| 1,632,203 | Threefoot | June 14, 1927 |
| 1,849,148 | Mojonnier | Mar. 15, 1932 |
| 1,980,411 | Kimball | Nov. 13, 1934 |
| 2,028,410 | Rapidsarda | Jan. 21, 1936 |
| 2,575,220 | Hiller | Nov. 13, 1951 |
| 2,596,339 | Lufkin | May 13, 1952 |
| 2,597,387 | Seidel | May 20, 1952 |
| 2,598,222 | Cahners | May 27, 1952 |
| 2,600,726 | Behrens | June 17, 1952 |
| 2,629,503 | Neja | Feb. 24, 1953 |
| 2,702,132 | Van Doren | Feb. 15, 1955 |
| 2,742,316 | Phillips | Apr. 17, 1956 |
| 2,769,570 | Adams | Nov. 6, 1956 |
| 2,781,139 | Gordon et al. | Feb. 12, 1957 |

FOREIGN PATENTS

| 126,300 | Sweden | Sept. 27, 1949 |